(12) United States Patent
Wheatley

(10) Patent No.: US 9,034,775 B2
(45) Date of Patent: May 19, 2015

(54) CARBON REINFORCED CONCRETE

(71) Applicant: Fortress Stabilization Systems, Dexter, MI (US)

(72) Inventor: Donald E. Wheatley, Ann Arbor, MI (US)

(73) Assignee: Fortress Stabilization Systems, Holland, MI (US)

( * ) Notice: Subject to any disclaimer, the term of this patent is extended or adjusted under 35 U.S.C. 154(b) by 262 days.

(21) Appl. No.: 13/720,336

(22) Filed: Dec. 19, 2012

(65) Prior Publication Data

US 2013/0108825 A1 May 2, 2013

Related U.S. Application Data

(60) Division of application No. 12/495,913, filed on Jul. 1, 2009, now Pat. No. 8,367,569, which is a continuation-in-part of application No. 12/201,740, filed on Aug. 29, 2008, now Pat. No. 8,142,102, which (Continued)

(51) Int. Cl.
*B32B 5/12* (2006.01)
*C04B 28/02* (2006.01)
(Continued)

(52) U.S. Cl.
CPC ........... *B32B 5/12* (2013.01); *Y10T 428/24124* (2015.01); *Y10T 428/24074* (2015.01);
(Continued)

(58) Field of Classification Search
CPC ....... E01C 11/005; E01C 11/16; E01C 11/18; E01C 11/185; E01C 11/20; B32B 5/12
USPC .............. 442/20, 29, 149; 52/309.15, 309.16, 52/454, 514, 414
See application file for complete search history.

(56) References Cited

U.S. PATENT DOCUMENTS 2,898,258 A 8/1959 Meier et al.
3,239,403 A 3/1966 Williams
(Continued)

FOREIGN PATENT DOCUMENTS

JP 09-003745 A 1/1997
JP 09-057882 A 3/1997
(Continued)

OTHER PUBLICATIONS

ACI Structural Journal, Technical Paper, Title No. 91-S34, May-Jun. 1994, "Fiber Composites for New and Existing Structure," by Hamid Saadatmanesh.

(Continued)

*Primary Examiner* — Jenna Johnson
(74) *Attorney, Agent, or Firm* — Harness, Dickey & Pierce, P.L.C.

(57) ABSTRACT

A structure may include a plurality of first fiber bundles, a plurality of second fiber bundles, and a plurality of connecting threads. The first fiber bundles may extend substantially parallel to each other. The second fiber bundles may extend substantially parallel to each other and substantially perpendicular to the first fiber bundles. The connecting threads may engage the first fiber bundles and the second fiber bundles such that at least one of the connecting threads is continuously wrapped around each of the first fiber bundles in a helical pattern. The at least one of the connecting threads may extend across a width of each of the second fiber bundles, and may thereby secure the second fiber bundles to each of the first fiber bundles. The first and second fiber bundles may be embedded in a construction material and adapted to reinforce the construction material.

9 Claims, 16 Drawing Sheets

Related U.S. Application Data is a continuation-in-part of application No. 11/754,144, filed on May 25, 2007, said application No. 12/495,913 is a continuation-in-part of application No. 12/212,110, filed on Sep. 17, 2008, now abandoned.

(60) Provisional application No. 60/809,077, filed on May 26, 2006, provisional application No. 60/973,866, filed on Sep. 20, 2007.

(51) Int. Cl.
  *E01C 11/16* (2006.01)
  *E01C 11/18* (2006.01)
  *E01C 11/00* (2006.01)
  *E01D 19/08* (2006.01)
  *C04B 111/00* (2006.01)

(52) U.S. Cl.
  CPC ............... *E01C11/185* (2013.01); *E01C 11/18* (2013.01); *C04B 28/02* (2013.01); *C04B 2111/00379* (2013.01); *C04B 2111/0075* (2013.01); *E01C 11/005* (2013.01); *E01D 19/083* (2013.01)

(56) References Cited

U.S. PATENT DOCUMENTS

| | | |
|---|---|---|
| 3,344,608 A | 10/1967 | McEachran |
| 4,113,401 A | 9/1978 | McDonald |
| 4,233,356 A | 11/1980 | Jacobs |
| 4,242,779 A | 1/1981 | Curinier et al. |
| 4,265,563 A | 5/1981 | Marzocchi et al. |
| 4,472,086 A | 9/1984 | Leach |
| 4,540,311 A | 9/1985 | Leach |
| 4,551,994 A | 11/1985 | Vailati et al. |
| 4,631,932 A | 12/1986 | Sommers |
| 4,786,341 A | 11/1988 | Kobatake et al. |
| 4,786,549 A | 11/1988 | Richards |
| 4,916,874 A | 4/1990 | McCoy et al. |
| 5,026,609 A | 6/1991 | Jacob et al. |
| 5,246,306 A | 9/1993 | Shoesmith et al. |
| 5,464,304 A | 11/1995 | Dittmar |
| 5,630,677 A | 5/1997 | Barroso |
| 5,635,263 A | 6/1997 | Saito |
| 5,640,825 A | 6/1997 | Ehsani et al. |
| 5,649,398 A | 7/1997 | Isley, Jr. et al. |
| 5,836,715 A | 11/1998 | Hendrix et al. |
| 5,845,450 A | 12/1998 | Larsen |
| 5,868,399 A | 2/1999 | Schluter |
| 5,882,749 A | 3/1999 | Jones et al. |
| 5,894,003 A | 4/1999 | Lockwood |
| 5,941,656 A | 8/1999 | Sugiyama et al. |
| 6,004,888 A | 12/1999 | Sugimoto et al. |
| 6,052,960 A | 4/2000 | Yonemura |
| 6,145,260 A | 11/2000 | Morton |
| 6,263,629 B1 | 7/2001 | Brown, Jr. |
| 6,418,684 B1 | 7/2002 | Morton |
| 6,450,729 B1 | 9/2002 | Clapp |
| 6,627,290 B2 | 9/2003 | Wittlinger et al. |
| 6,648,547 B2 | 11/2003 | Jones et al. |
| 6,682,260 B2 | 1/2004 | Peltz |
| 6,692,595 B2 | 2/2004 | Wheatley et al. |
| 6,694,690 B2 | 2/2004 | Li et al. |
| 6,696,125 B2 | 2/2004 | Zanchetta et al. |
| 6,746,741 B2 | 6/2004 | Wheatley |
| 6,846,537 B2 | 1/2005 | Wheatley et al. |
| 7,048,880 B2 | 5/2006 | Kia et al. |
| 7,232,276 B2 | 6/2007 | Oka et al. |
| RE39,839 E | 9/2007 | Wheatley et al. |
| 7,597,503 B2 | 10/2009 | Hinding et al. |
| 2004/0025465 A1* | 2/2004 | Aldea et al. ............... 52/514 |
| 2004/0194424 A1 | 10/2004 | Frost et al. |
| 2005/0241260 A1 | 11/2005 | Wheatley |
| 2006/0059827 A1 | 3/2006 | Wheatley |
| 2007/0272353 A1 | 11/2007 | Wheatley et al. |
| 2009/0071085 A1 | 3/2009 | Wheatley et al. |
| 2009/0081913 A1 | 3/2009 | Wheatley |
| 2009/0214293 A1 | 8/2009 | Wheatley |
| 2009/0263572 A1 | 10/2009 | Wheatley |

FOREIGN PATENT DOCUMENTS

| | | |
|---|---|---|
| JP | 10-033053 A | 2/1998 |
| JP | 10-037051 A | 2/1998 |
| JP | 2000265141 | 9/2000 |
| JP | 2002-155509 A | 5/2002 |

OTHER PUBLICATIONS

Coatings for Safety, Procedures for better coatings may help prevent black ice. Concrete Surfaces Magazine (Dec. 1, 2007). http://www.concreteconstruction.net/industry-news.asp?sectionID=718&articleID=634984 (2 pages).

ACI Structural Journal, Technical Paper, Title No. 91-S17, Mar.-Apr. 1994, "Strengthening of Initially Loaded Reinforced Concrete Beams Using FRP Plates," by Alfarabi Shari, G.J. Al-Sulaimani, I.A. Basunbuil, M.H. Baluch, and B.N. Ghaleb.

* cited by examiner

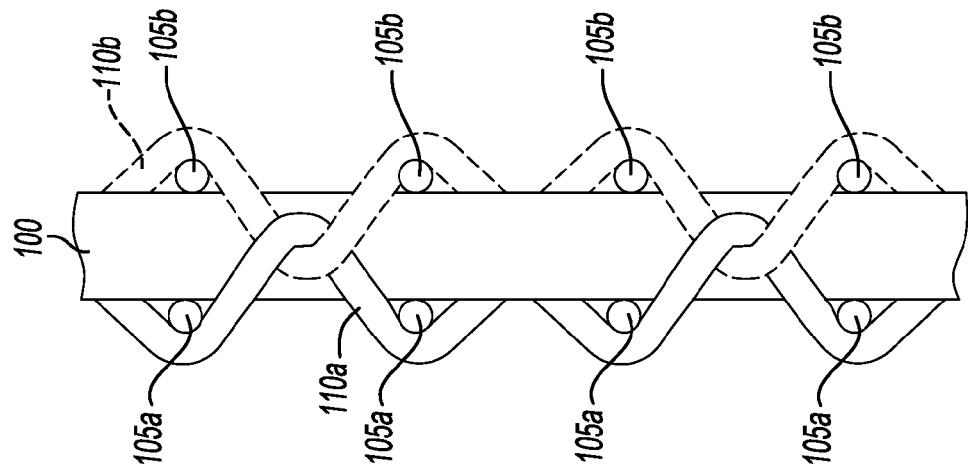
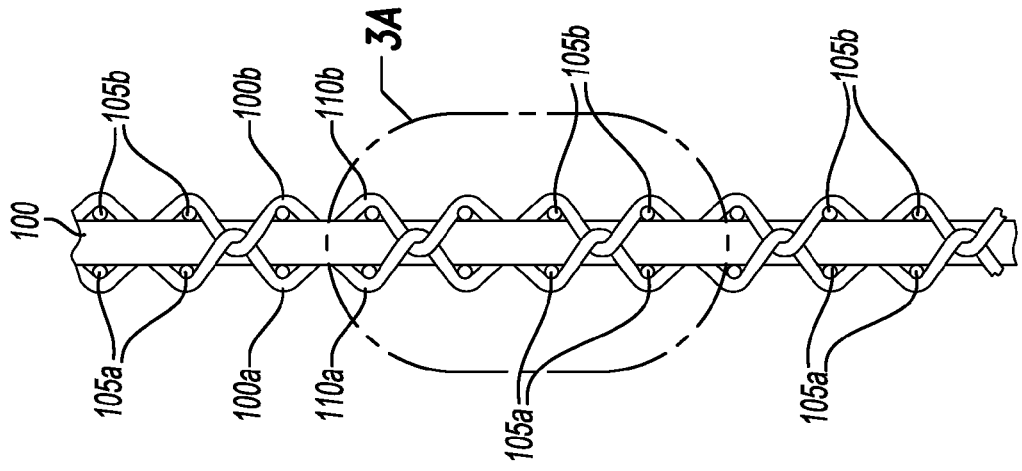
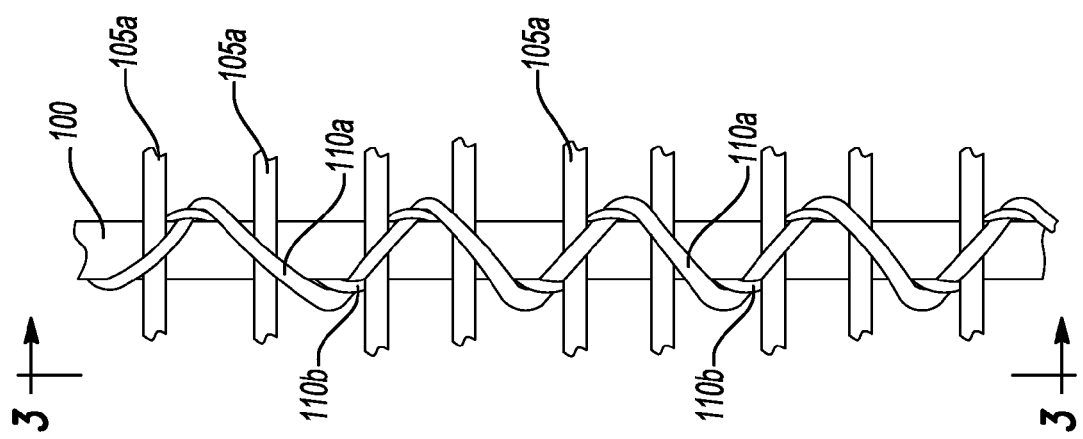

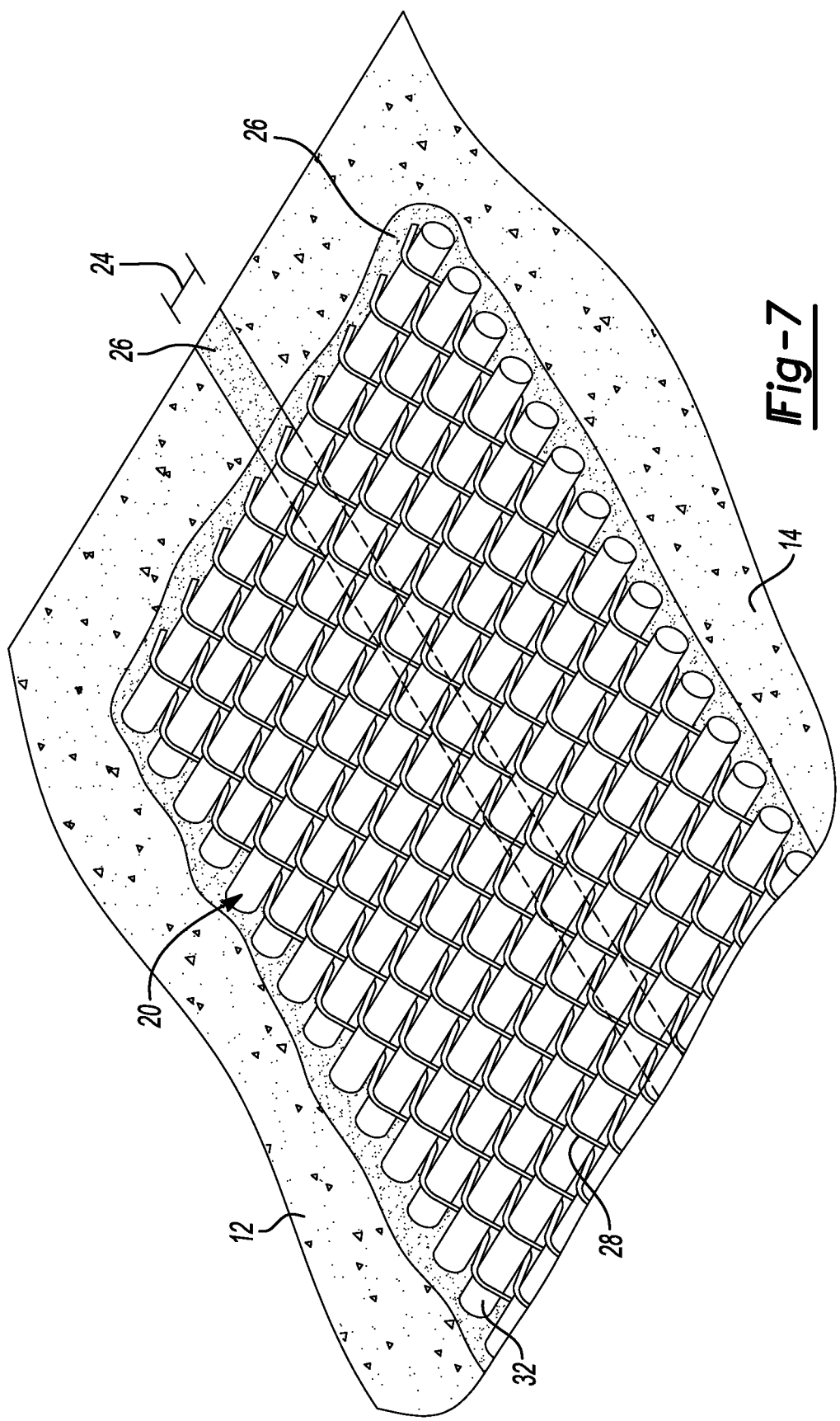

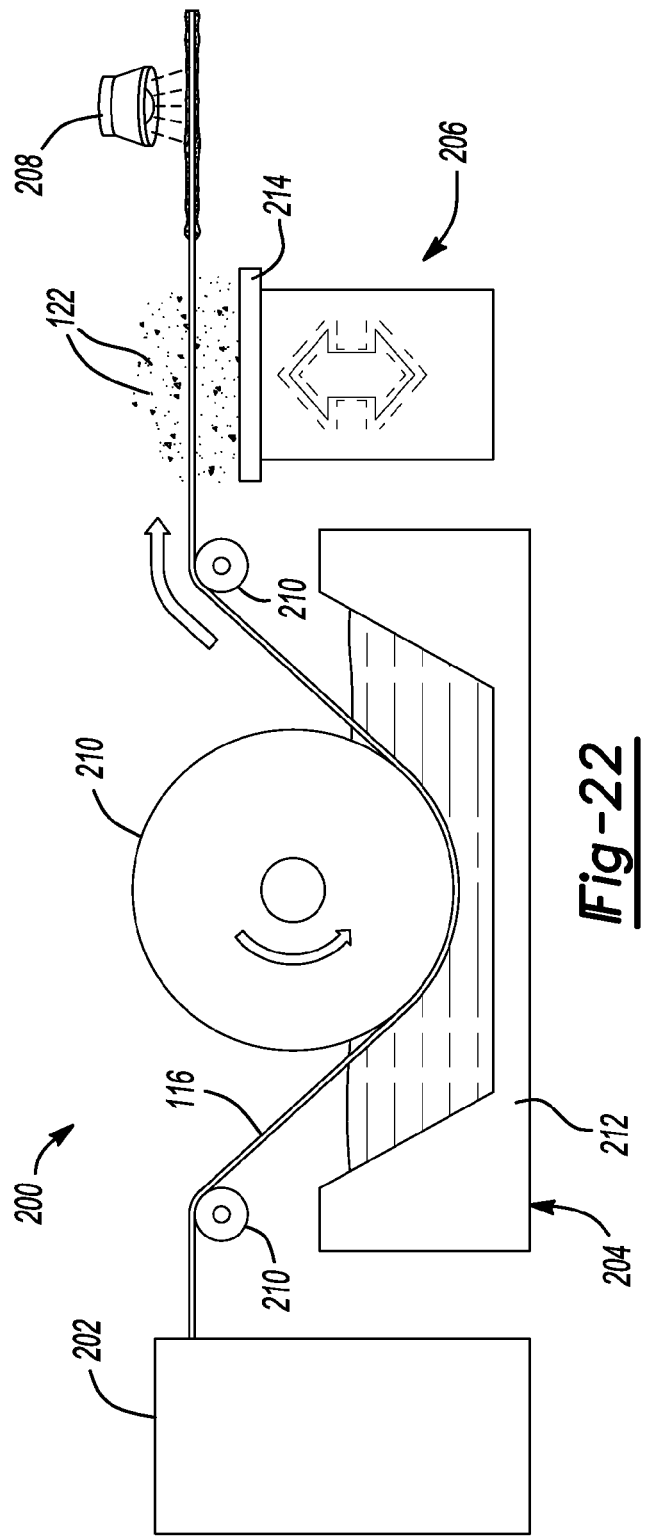
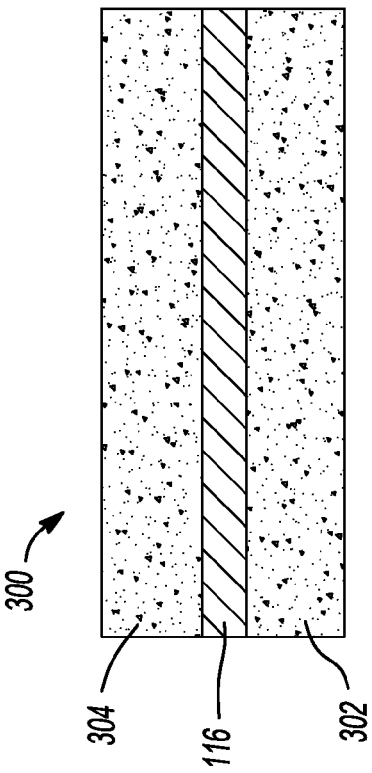

CARBON REINFORCED CONCRETE

CROSS-REFERENCE TO RELATED APPLICATIONS

This application is a divisional of U.S. patent application Ser. No. 12/495,913, filed Jul. 1, 2009 (now U.S. Pat. No. 8,367,569, issued Feb. 5, 2013), which is a continuation-in-part of U.S. patent application Ser. No. 12/201,740, filed Aug. 29, 2008 (now U.S. Pat. No. 8,142,102 issued Mar. 27, 2012), which is a continuation-in-part of U.S. patent application Ser. No. 11/754,144, filed May 25, 2007, which claims priority to U.S. Provisional Application No. 60/809,077, filed May 26, 2006 (now expired). U.S. patent application Ser. No. 12/495,913 (now U.S. Pat. No. 8,367,569) is also a continuation-in-part of U.S. patent application Ser. No. 12/212,110, filed Sep. 17, 2008 (now abandoned), which claims priority to U.S. Provisional Application No. 60/973,866, filed Sep. 20, 2007 (now expired). The entire disclosures of each of the above applications are incorporated herein by reference.

FIELD

The present disclosure relates to reinforced concrete, and more particularly to carbon reinforced concrete.

BACKGROUND

This section provides background information related to the present disclosure which is not necessarily prior art.

Segmented bridges have been used for many years as cost effective and structurally sound bridge architecture. A typical segmented bridge may include pre-constructed bridge segments that are formed in predetermined lengths of for example 10 feet and full road widths of over 10 feet and more typically over 20 feet wide. The bridge segments are butted end to end and supported primarily by an interior cable system that runs through passages formed within the concrete bridge segments. A series of bridge segments comprise a bridge span that extends from one pillar to another. It is important to seal the seam that is created at the location where two bridge segments are butted together to prevent water from penetrating the seam and getting to the cable system where the water can cause corrosion of the support cables within the bridge segments. A prior method of sealing the seam has included cutting a groove along the upper surface of the bridge segments along the seam and filling the cut groove with an epoxy. However, the epoxy filled grooves are still capable of leakage failure and it is desirable to provide a cost effective and improved method of sealing the seams between the bridge segments.

Additionally, repairing a distressed road surface often involves replacement of concrete, asphalt paving or asphalt patching, and/or overlay systems. These methods for repairing a distressed road surface have many disadvantages. Patching material generally provides a temporary repair, over time the patch deteriorates and the road requires subsequent repair. Replacing concrete and asphalt paving are costly and time consuming. These projects are halted during the winter months in regions where the temperatures are below freezing. Overlay repair is problematic because any movement that occurs in the underlying road surface will produce stress in the overlay and can cause physical tearing of the overlay if the stress in the overlay exceeds the tensile strength of the overlay material.

Walls constructed of concrete blocks are well known in the field of construction and have been extensively used for both above ground and basement walls. Such concrete walls constructed in this manner are generally capable of supporting residential and light commercial structures and are relatively inexpensive to manufacture and repair.

In order to construct a concrete wall, individual blocks are laid end to end and successive rows or courses are stacked thereon. Mortar between each adjacent block and row secures the wall together. These walls are such that they have excellent compressive strength to support structures placed upon them. However, these walls are inherently weak with respect to lateral loads and are particularly susceptible to cracking from water pressure. This inherent weakness of concrete walls is attributable to the structural characteristics of the concrete walls themselves and the mortar joints at which they are connected. Walls constructed in this manner are relatively strong in compression and are thus well suited for supporting overlying structures. However, both the concrete material and particularly the mortar joints are weak in tension, and when subjected to a tensile force, they tend to separate relatively easily.

Water penetrating deeply into the soil adjacent a basement wall can cause substantial lateral movement of the expanding soil against the wall. Over a period of time, block or concrete walls develop diagonal cracks at the ends and vertical cracks near their centers. Such cracks can admit water under pressure from the surrounding soil and, if left untreated, can progressively widen and eventually facilitate collapse of the entire structure with resultant damage to the structure supported on it. In addition to developing such cracks, concrete walls typically either bow inwardly and such bowing or tilting steadily worsens with the weight of the overlying structure. The water pressure exerts a compressive force at the outer end, therefore, basement wall cracks tend to develop on the inside of such walls.

One of the traditional methods of repairing the leaks and cracks and relieving the external pressure is to drill holes and provide for channeling of the water away on the inside. Yet another method for repairing cracks and leaks is to inject an epoxy resin into the cracks. Although these methods will prevent further water from entering the cracks they do not bind the concrete walls and prevent further cracking or bowing of the concrete walls.

Yet another means of correcting the cracks in the walls is to use fiberglass cloth with epoxy or polyester resin. Fiberglass has good tensile properties and can carry the load on the interior of the basement walls that is in tension. However, one of the major drawbacks with this method is that mixing the epoxy or polyester and wetting out the fabric is time consuming and messy.

In recent years, technology has developed whereby the concrete walls are reinforced using precut strips of carbon fiber. This prevents the walls from cracking or collapsing. However, precut carbon fiber strips have to be cleaned and roughened, commonly done through sanding, to provide mechanical adhesion with the walls. The sanding process is not only time consuming, but is completely dependent on the skill of the operator sanding the surface of the strip. Sanding also may not remove oil or waxy materials and may spread such contaminants with a detrimental affect on bonding. This results in extra cost in transporting and storing the precut strips. Applicant's U.S. Pat. No. 6,692,595 is hereby incorporated by reference and provides a rigidified reinforcement material using a woven carbon and nylon strands coated with a cured resin material and with a removable backing material to leave a textured or roughened surface to enhance mechanical adhesion. The rigidified reinforcement material may be expensive to manufacture in long strips as is required in some reinforcement applications.

SUMMARY

This section provides a general summary of the disclosure, and is not a comprehensive disclosure of its full scope or all of its features.

In one form, the present disclosure provides a structure that may include a plurality of first fiber bundles, a plurality of second fiber bundles, and a plurality of connecting threads. The plurality of first fiber bundles may extend substantially parallel to each other. The plurality of second fiber bundles may extend substantially parallel to each other and substantially perpendicular to the plurality of first fiber bundles. The plurality of connecting threads may engage the plurality of first fiber bundles and the plurality of second fiber bundles such that at least one of the plurality of connecting threads is continuously wrapped around each of the plurality of first fiber bundles in a helical pattern. The at least one of the connecting threads may extend across a width of each of the plurality of second fiber bundles, and may thereby secure the plurality of second fiber bundles to each of the plurality of first fiber bundles. The first and second fiber bundles may be embedded in a construction material and adapted to reinforce the construction material.

In another form, the present disclosure provides a method of providing reinforced concrete that may include providing a plurality of substantially parallel first fiber bundles, providing a plurality of substantially parallel second fiber bundles, weaving a plurality of connecting threads around the plurality of first fiber bundles and the plurality of second fiber bundles such that the first fiber bundles are secured perpendicular to the second fiber bundles, thereby forming a woven grid of first and second fiber bundles; applying an adhesive to the woven grid; applying an aggregate material to the woven grid such that the aggregate material is at least partially embedded into the adhesive; curing the adhesive to bond the aggregate to the woven grid; pouring a layer of wet concrete; embedding the woven grid into the wet concrete; and allowing the wet concrete to set.

In yet another form, the present disclosure provides a structure that may include a plurality of first fiber bundles, a plurality of second fiber bundles, an adhesive, and an aggregate material. The plurality of first fiber bundles may extend substantially parallel to each other. The plurality of second fiber bundles may extend substantially parallel to each other and substantially perpendicular to the plurality of first fiber bundles. The adhesive may substantially coat the pluralities of first and second fiber bundles. The aggregate material may be adhered to the pluralities of first and second fiber bundles by the adhesive. The first and second fiber bundles may be embedded in a construction material and adapted to reinforce the construction material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is an illustration of a weave used in making a carbon fiber bundle reinforcement material according to some embodiments of the present disclosure;

FIGS. 3 and 3A are cross-sectional views taken along line 3-3 of FIG. 2, illustrating the weave used in making a carbon fiber bundle reinforcement material according to some embodiments of the present disclosure;

FIG. 7 is a perspective view of a fibrous material spanning a gap between a pair of cement segments and in contact with an adhesive according to some embodiments of the present disclosure;

FIG. 22 is a schematic representation of a production process that may be employed to manufacture the woven member; and FIG. 23 is a schematic view of a concrete segment having the woven member embedded therein.

Corresponding reference numerals indicate corresponding parts throughout the several views of the drawings.

DETAILED DESCRIPTION

Figure 1:
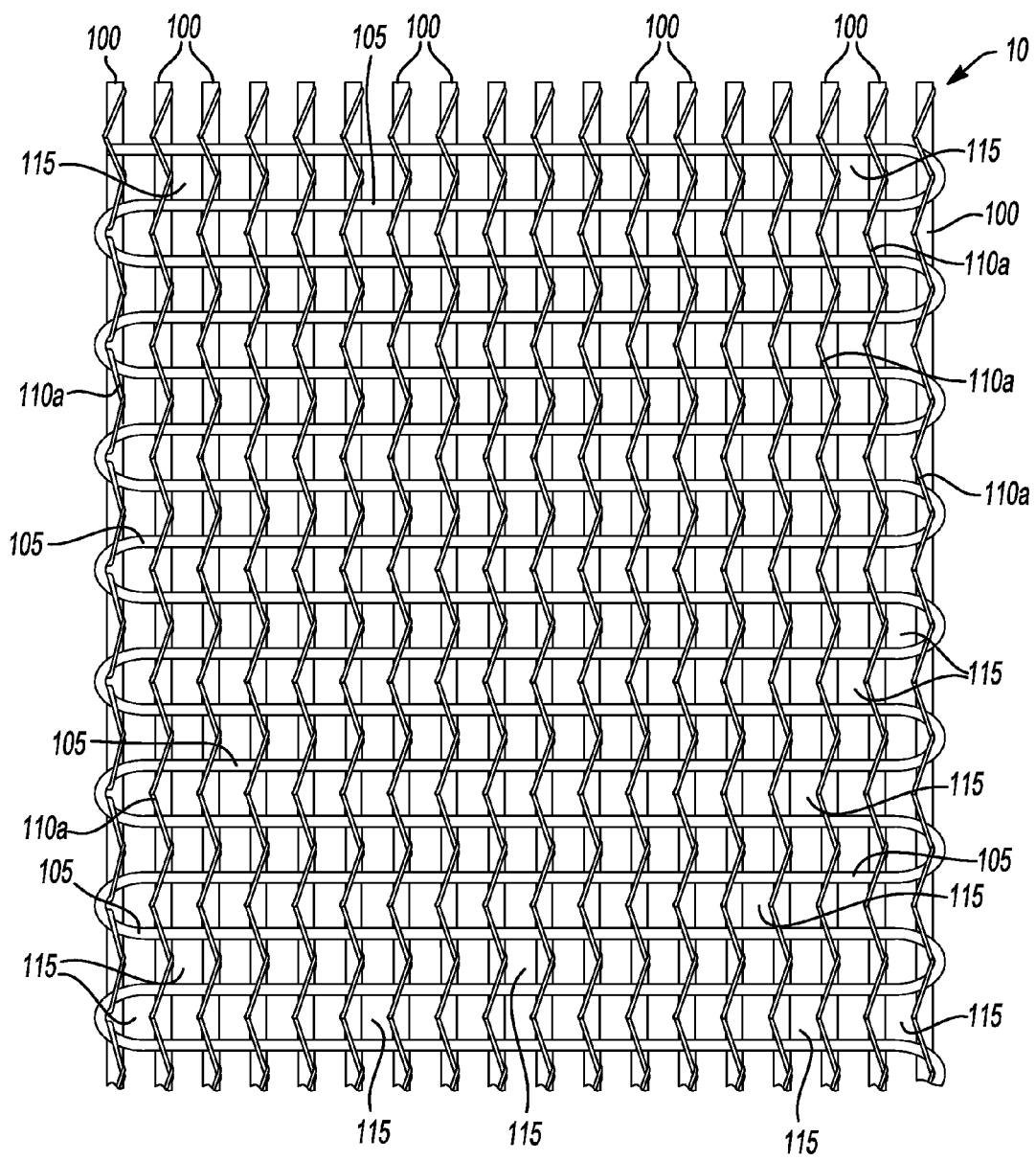
FIG. 1 is a plan view of a carbon fiber bundle reinforcement material according to the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a portion of a carbon fiber reinforcement material 10 is shown. The material 10 comprises a plurality of longitudinal fiber bundles 100, transverse threads 105a, 105b and connecting threads 110a, 110b. The longitudinal fiber bundles 100 can be carbon fibers. The material 10 can be woven as illustrated in FIGS. 2-3. The weave can be a circular knit pattern that is known to be used to made elastic waistbands. A weaving machine such as, for example, the Jakob Mueller Rashelina RD3 may be set up to automate the weave to make the material 10.

In the weave pattern shown in FIG. 1, the longitudinal fiber bundles 100 are provided in parallel to one another with the transverse threads 105a, 105b provided in a continuously serpentine pattern with one serpentine thread pattern 105a on a first side of the longitudinal fiber bundles 100 and a second serpentine thread pattern 105b overlaying a second side of the longitudinal fiber bundles 100 in identical fashion. The connecting threads 110a, 110b include two threads 110a, 110b for each longitudinal fiber bundle 100 with each connecting thread 110a diagonally crossing the transverse threads 105a as they cross over the longitudinal fiber bundles 100, as illustrated in FIG. 2. The connecting threads 110a continually cross over the transverse threads 105a on a single side of the woven material 10 while the connecting threads 110b continually cross over the transverse threads 105b on the opposite side of the woven material 10. In between each transverse thread 105a, 105b, the connecting threads 110a, 110b from each side of the woven material 10 cross over each other, as illustrated in the cross-section of FIGS. 3 and 3A, and return to diagonally cross over the subsequent transverse thread 105a, 105b. The weave pattern has finished edges on each side and can be made much more easily than prior art weave patterns which require long narrow strips to be cut from wide sheets. Other weave patterns for elastic waistbands may be used such as those described in U.S. Pat. Nos. 4,551,994; 5,882,749; 4,786,549; and 4,631,932. The woven material 10 is rigid in the longitudinal direction and in contrast, the elastic waistband is elastic (stretchable) in the longitudinal direction. The woven material 10 can be provided with open spaces 115 in the weave which allows an adhesive to flow through the woven material 10 when the material 10 is applied to a structure.

The woven material 10 can be rigidified. In some embodiments the material is rigidified and cut into strips that are from abut 7 feet to about 12 feet in length. Such lengths are useful for applying the material 10 to basement walls. The rigidification of fiber material includes coating the material in epoxy that is procured as described in commonly assigned U.S. Pat. Nos. 6,846,537; 6,746,741; and 6,692,595, each of which is herein incorporated by reference in their entirety. The application of a material to repair a crack in a basement wall are described in the above mentioned patents and is applicable to the woven material 10 described herein.

In some embodiments, the longitudinal fibers 100 and transverse threads 105a. 105b may be spaced anywhere from over 1 inch apart to less than 1/32 inches apart so long as the open spacing 115 is sufficient to allow adhesive to flow between the fibers bundles 100 and transverse threads 105a, 105b. The material 10 has a roughened surface exposed or produced upon removal of a cover sheet applied during the rigidification process. In some embodiments, the longitudinal fibers 100 are made of pre-cured carbon, although any material providing flexibility and tensional strength may be used. Moreover, longitudinal fibers 100 and transverse threads 105a, 105b may be of different materials. For example, longitudinal fibers 100 may be Kevlar or bundles of Kevlar and transverse threads 105a, 105b may be a nylon or a nylon blend. Other examples of longitudinal fibers 100 include carbon fibers, poly-parapheneylene tetraphthalamide, para-aramid nylon, aramid fiber, aromatic polyamide, and combinations thereof. In some embodiments, longitudinal fibers can be in bundles or individual fibers. Other examples of transverse threads 105a, 105b can include nylon, polyester, polypropylene, nomex, cotton, carbon fibers, poly-parapheneylene tetraphthalamide, para-aramid nylon, aramid fiber, aromatic polyamide, and combinations thereof.

As discussed herein, to provide a strong bond between the rigidified fiber woven material 10, it is important to have the surface of the rigidified fiber woven material 10 clean and roughed. In order to keep the surface clean and provide a roughened surface, a flexible cover sheet of impermeable sheet or film comprising textile, nylon, a polymeric or plastic material is applied on one or both surfaces of the woven material using a rigidifying adhesive material.

At the job site, the cover sheet prevents dirt, grease and other debris from coming into contact with the woven material 10. Immediately prior to use, the cover sheet(s) is (are) removed, or more accurately peeled away, from the surface of the material 10 leaving exposed a clean roughened surface. This roughened surface is a result of at least two factors, individually or in combination. First, the textured surface of the cover sheet causes an impression to be formed in the adhesive material on the surface as it cures. Second, as the cover sheet is removed from the material 10, some of the adhesive material remains adhered to the cover sheet and breaks away from the material 10.

Figure 4:
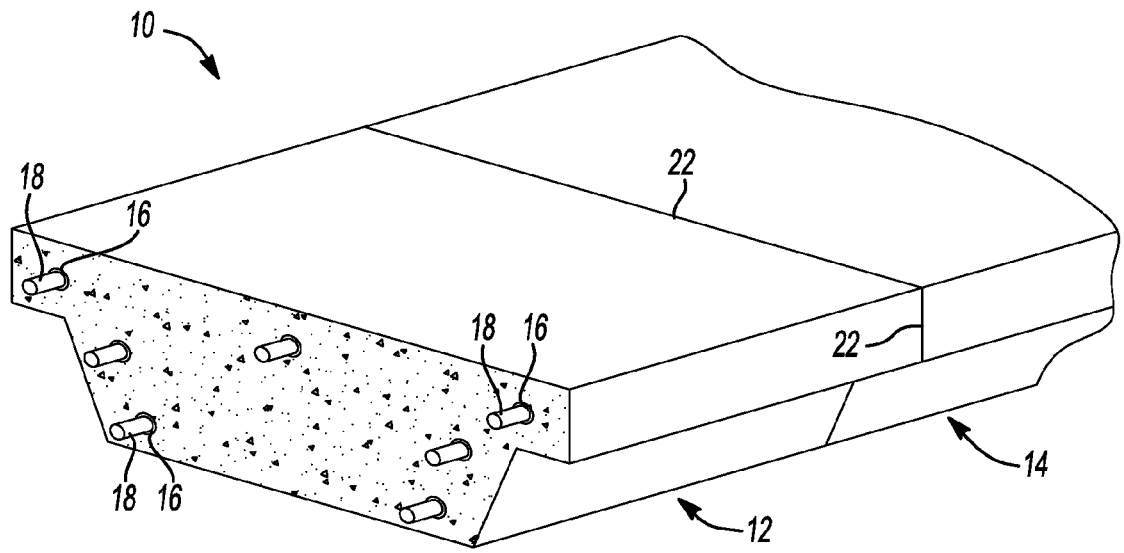
FIG. 4 is a partial perspective view of a pair of cement segments and cables of a segmented bridge.
Figure 6:
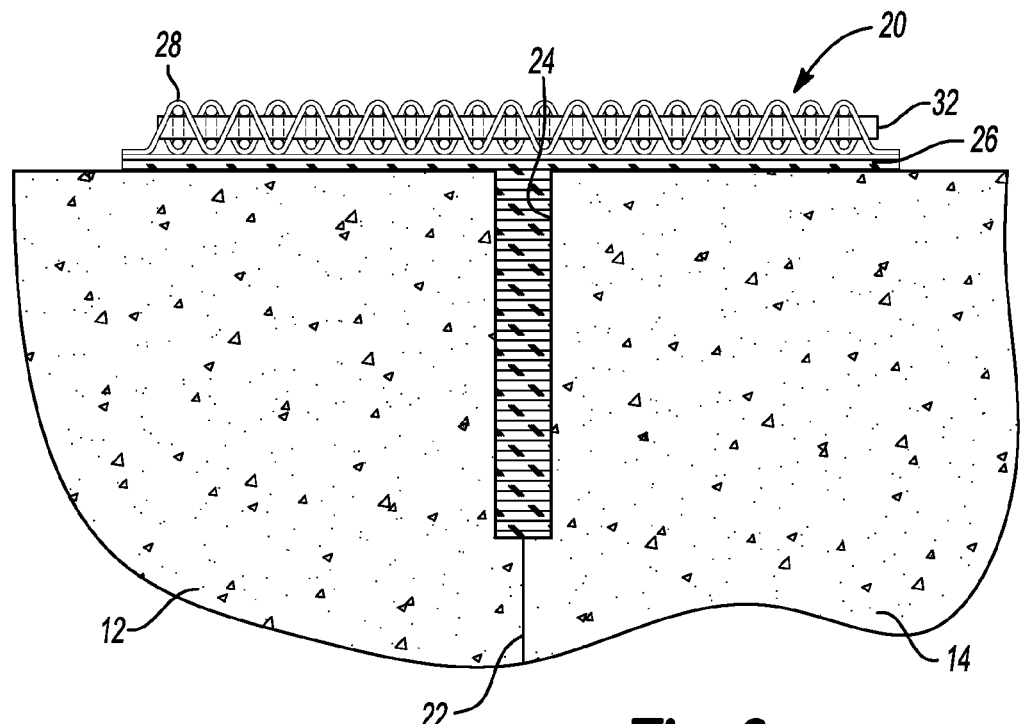
FIG. 6 is a cross-sectional view taken along line 6-6 of FIG. 5.
Figure 5:
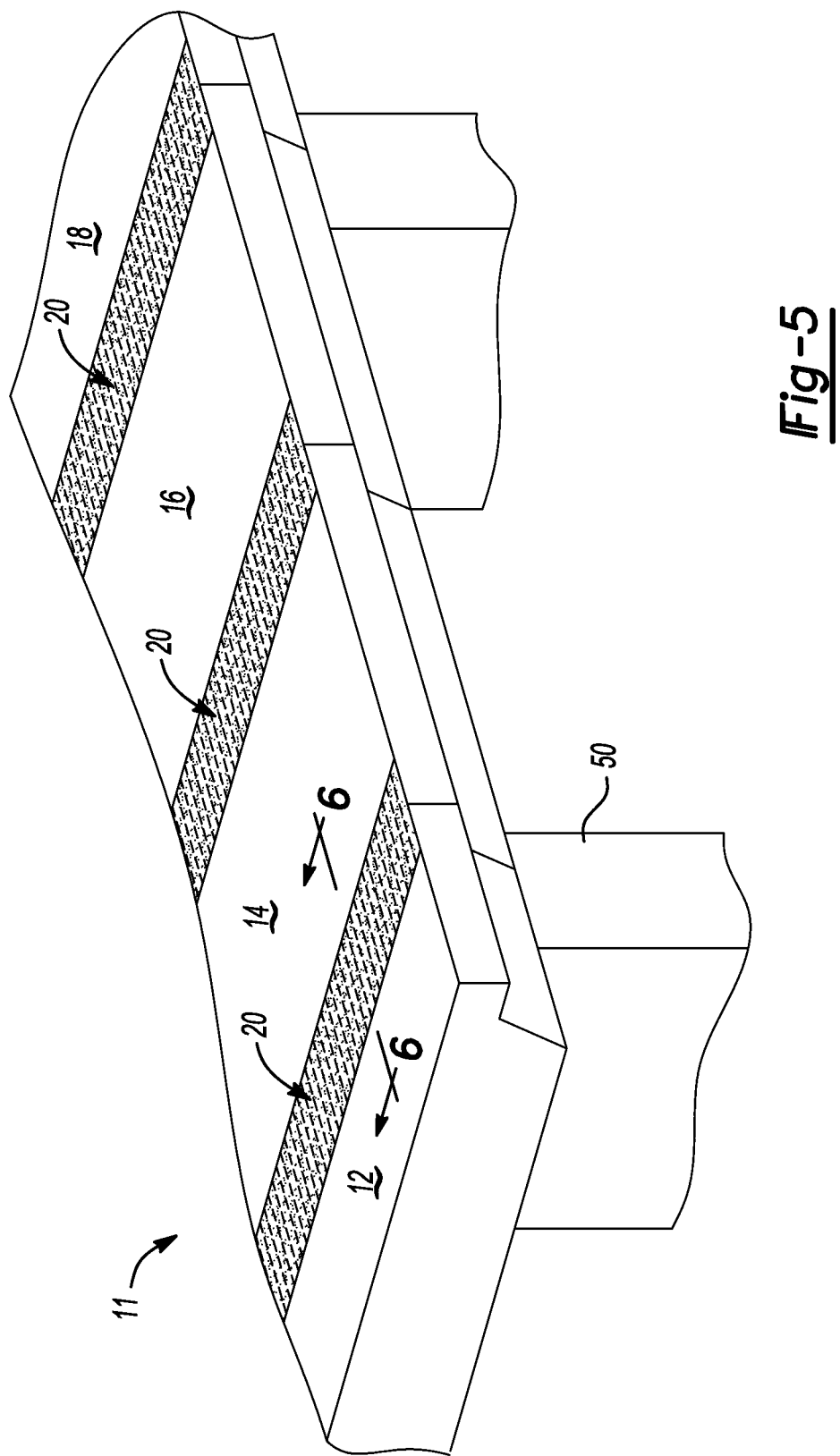
FIG. 5 is a partial perspective of a pair of cement segments, cables, and a sealed seam of a segmented bridge according to some embodiments of the present disclosure.
Figure 8:
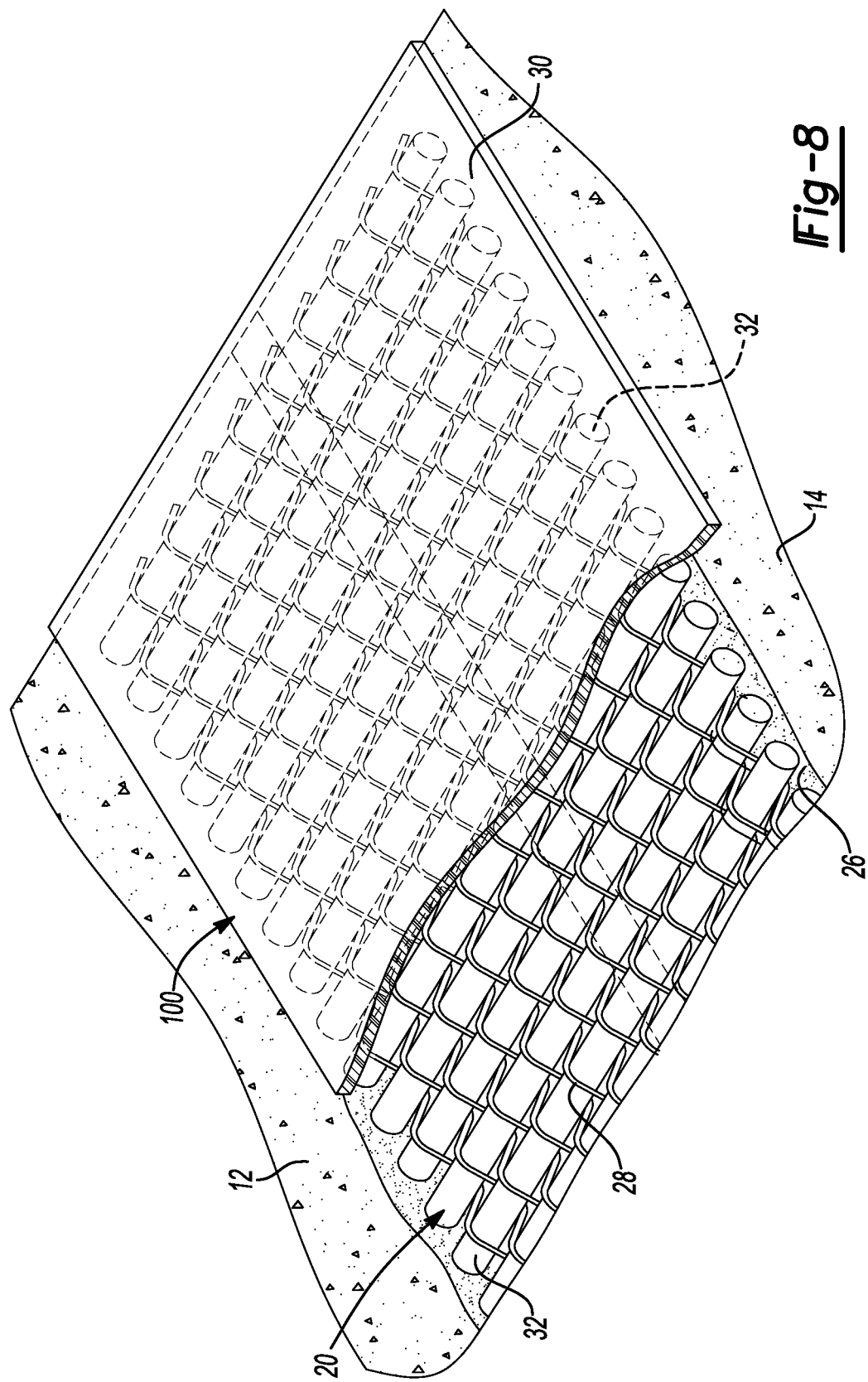
FIG. 8 is a perspective view of a sealed seam according to some embodiments of the present disclosure.

With reference to FIGS. 4-6, a portion of a segmented bridge 11 is shown including a first pre-constructed concrete bridge segment 12 and a second concrete bridge segment 14 that are shown butted together. The bridge segments 12, 14 each include passages 16 formed therein that receive a cable system (cables 18) that provides the primary support for the bridge segments 12, 14 as they extend between spaced pillars 50. A seam 22 is disposed between the bridge segments 12, 14. Optionally, a groove 24 can be cut or otherwise formed in the upper surface of the first and second bridge segments along the seam 22. The groove 24 can be filled with an epoxy adhesive material 26 such as an epoxy, an urethane sealant, a silicone sealant or other suitable sealants or combinations thereof.

An epoxy or other suitable adhesive material 26 is then applied along the surface of the bridge segments 12, 14 along the seam 22 and extending several inches therefrom. Preferably, the adhesive material 26 extends 2 to 12 inches in each direction on opposite sides of the seam 22. A strip of fibrous material 20 is then applied to the adhesive material 26 along the length of the seam 22. It should be noted that the adhesive material 26 may be applied to the fibrous material 20 or to the bridge segments 12, 14, or both. The fibrous material 20 can include fiber bundles 32 which may include carbon fibers, Kevlar fibers, fiberglass, carbon fibers, poly-parapheneylene tetraphthalamide, para-aramid nylon, aramid fiber, aromatic polyamide, and combinations thereof or other suitable man made and naturally occurring fibers that exhibit satisfactory strength and flexibility characteristics. The fibrous bundles 32 may be secured with a thread (not shown). The fibrous material 20 may include one or more threads 28 that are woven to desired densities to allow proper wetting of the material during application with the adhesive material 26. The fibrous material 20 can also be precoated with the adhesive material 26 and pre-cured to provide a flexible, yet relatively rigid material that aids in application of the fibrous material 20. It is desirable that the adhesive material 26 wets into the fibrous material 20 and/or the spaces between the transverse fiber bundles 32 to provide a fiber reinforced water resistant cover to the seam 22.

Figure 9:
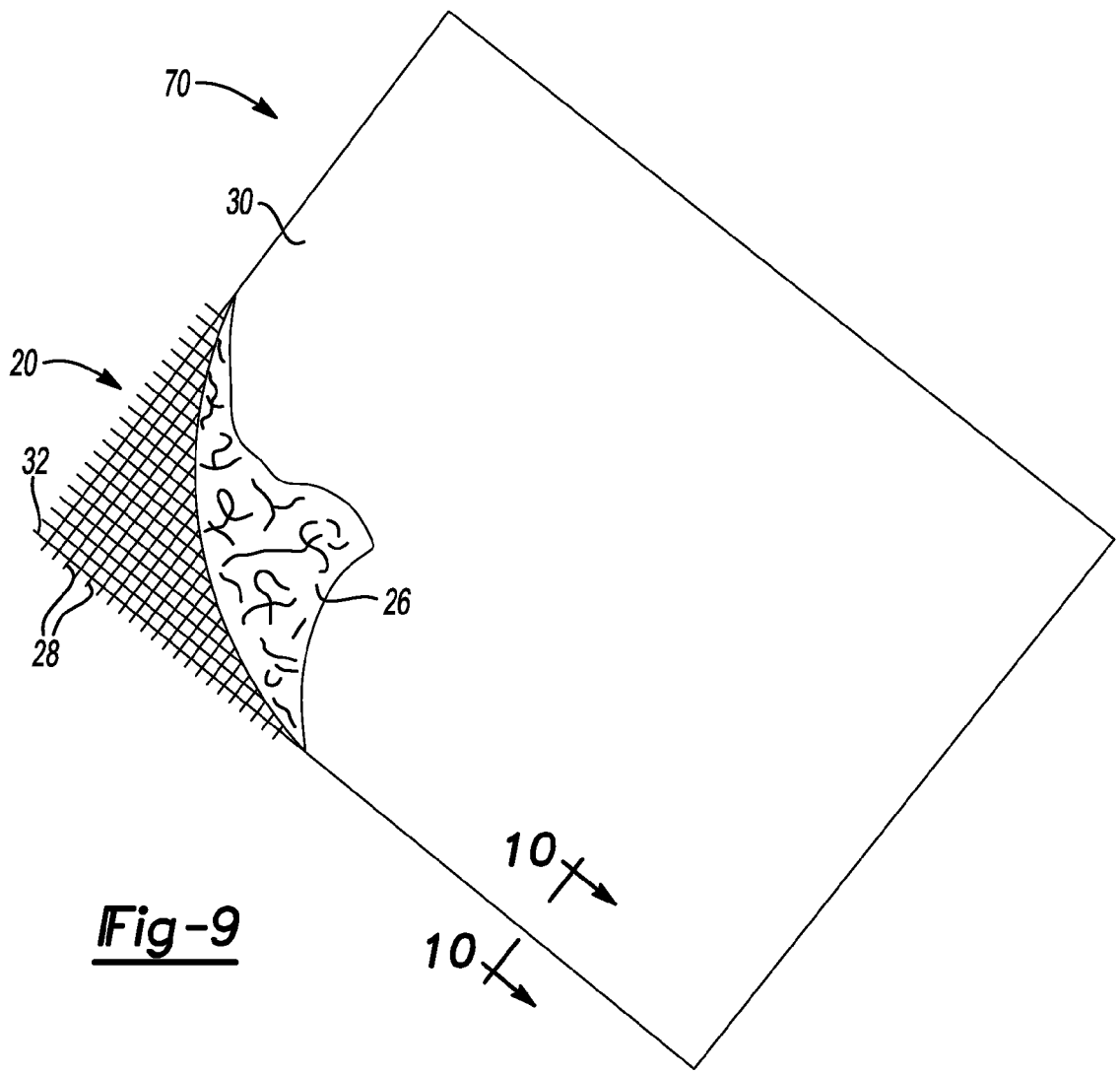
FIG. 9 is a top view of a fibrous material according to some embodiments of the present disclosure.
Figure 10:
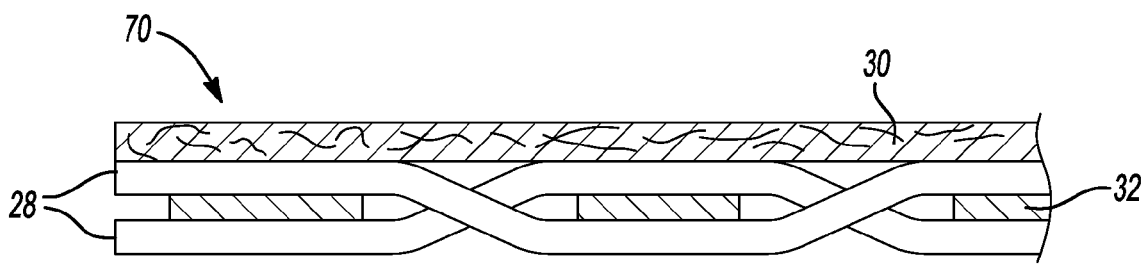
FIG. 10 is a cross-section view taken along lines 10-10.
Figure 11:
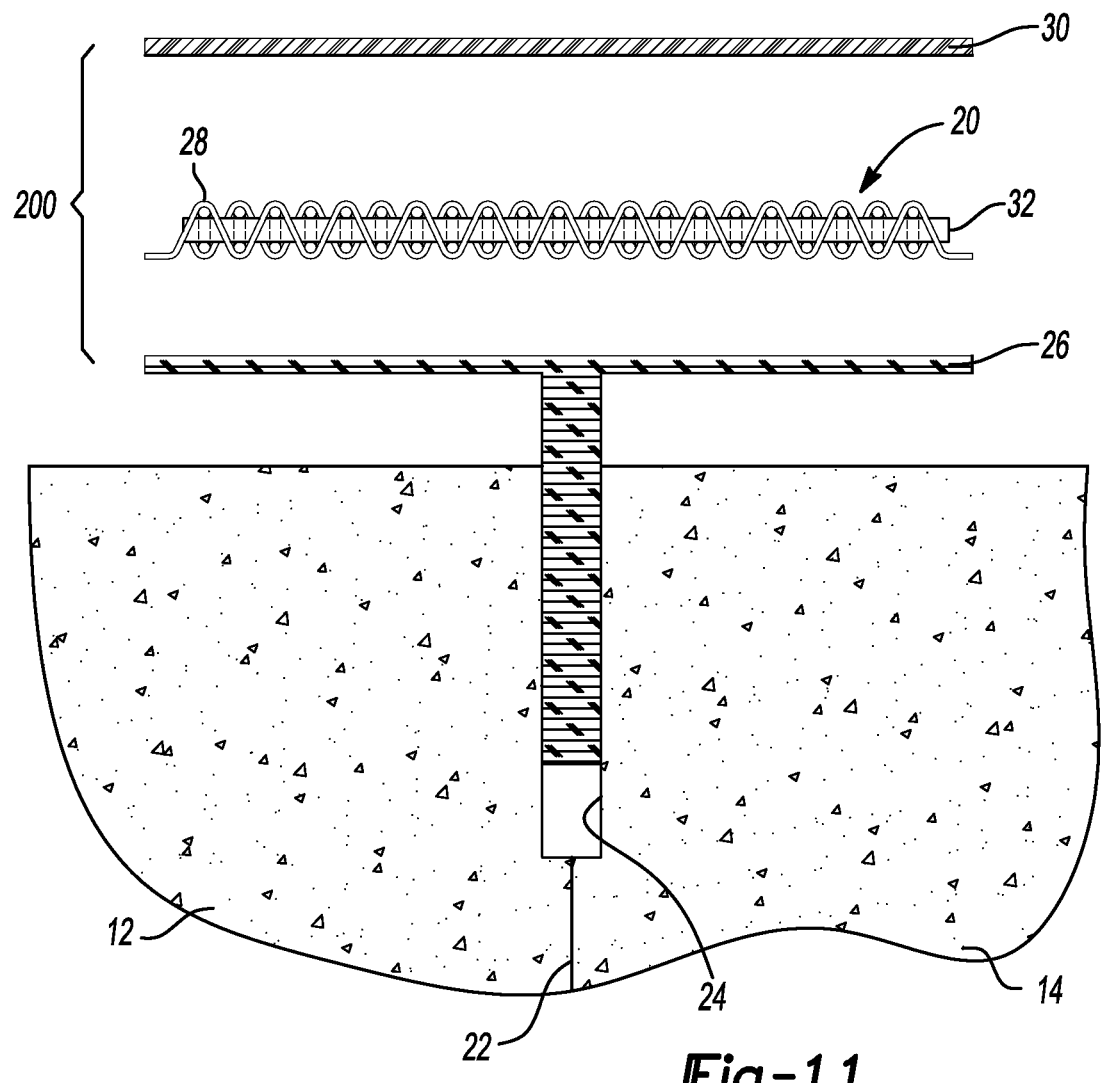
FIG. 11 is an exploded view of FIG. 6.

As shown in FIGS. 9-10, examples are illustrated according to the present disclosure of the rigidified fiber mesh tape 20, that can be used for sealing a seam 22 in the segmented bridge 11. The rigidified fiber mesh tape 20 comprises a number of transverse fibers 32 running the distance of the width of the mesh tape 106 and a number of longitudinal fibers or threads 28. The transverse fibers 32 run parallel to one another and are in tension. As best seen in FIG. 10, the longitudinal threads 28 can be woven into the transverse fibers 32, the longitudinal threads 28 alternating from a position above the transverse fibers 32 to a position below the transverse fibers 32. Alternatively, as best seen in FIG. 11, the longitudinal threads 28 sandwich the transverse fibers 32. In other words, the longitudinal threads 28 can be layered on top and below the transverse fibers 32, providing a fiber mesh 100 with a lower manufacturing cost. A further reduction of manufacturing cost may be achieved by providing only one of the layers of longitudinal threads 28, either on top or below.

Figure 12:
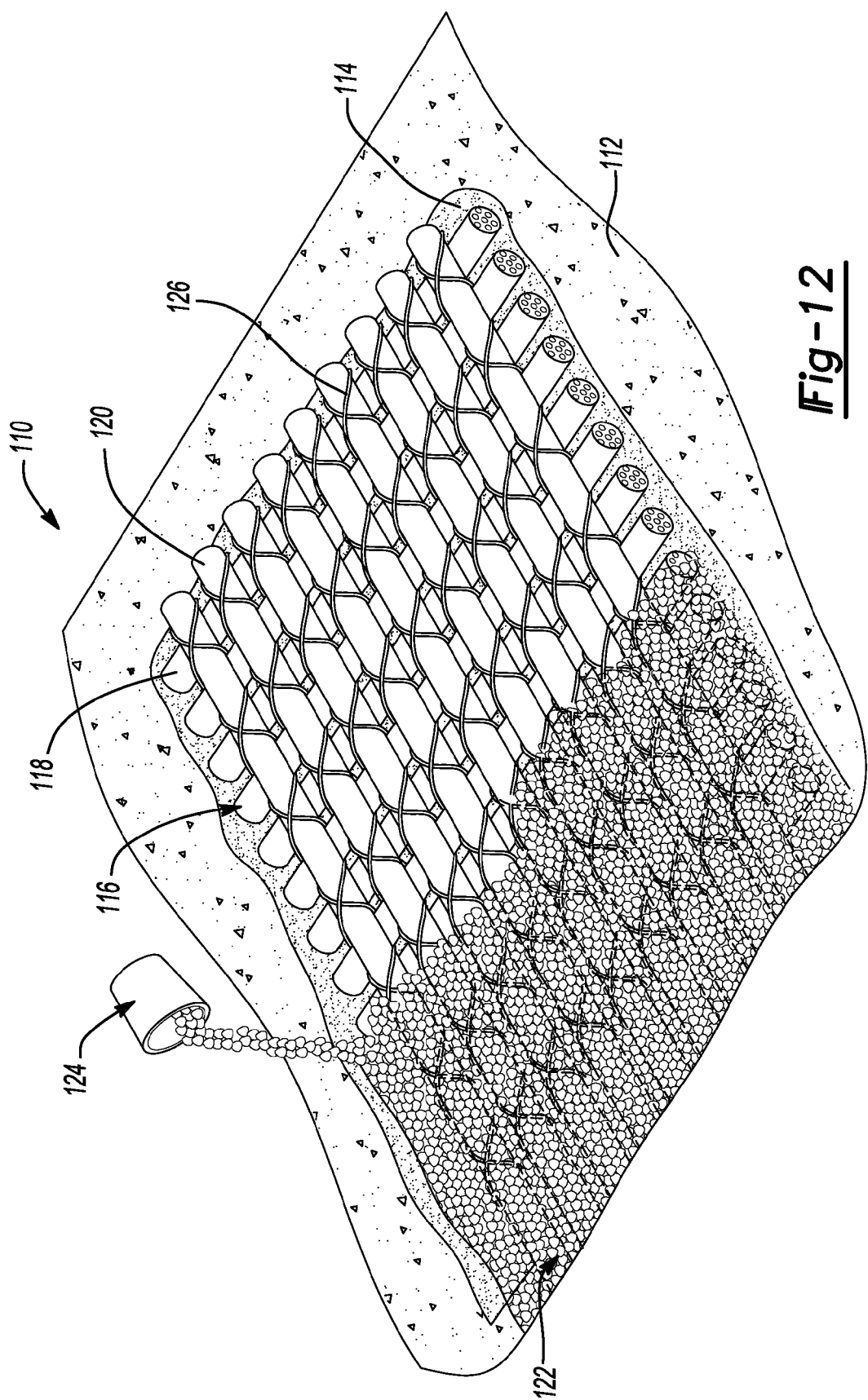
FIG. 12 is a partial perspective view of one embodiment of the road surface overlay system.

The transverse fibers 32 and longitudinal threads 28 may be of any cross-sectional shape, such as flat (ribbon like), rectangular, oval or round. In the same embodiments, the longitudinal threads 28 have a flat cross-section, as seen in FIGS. 10-12, providing a large surface area to contact the segments 12 and providing a low bending stiffness in the plane of the mesh tape 20.

As shown in FIGS. 7-10, the longitudinal threads 28 are generally at 90-degree angles (transverse) to the transverse fibers 32. In some embodiments, the longitudinal threads 28 may be at 45-degree angles to the transverse fibers 32, or some angle between 45-degrees and 90-degrees. In a 45-degree fiber orientation, the longitudinal threads 28 tend to be loaded in tension along with the transverse fibers 32.

In some embodiments, the transverse fibers 32 and longitudinal threads 28 may be spaced anywhere from over 1 inch apart to less than 1/32 inches apart so long as the spacing is sufficient to allow adhesive to flow between the fibers 102, 104, discussed herein. The rigidified fiber mesh tape 20 has a roughened surface 38 exposed or produced upon removal of a cover sheet 24, as will be discussed in detail herein. In some embodiments, the transverse fibers 32 and/or the longitudinal thread 28 are made of pre-cured carbon, although any material providing flexibility and tensional strength may be used. Moreover, transverse fibers 32 and longitudinal threads 28 may be of different materials. For example, transverse fibers 32 may be Kevlar or bundles of Kevlar and longitudinal threads 28 may be a nylon or a nylon blend. Other examples of transverse fibers 32 include carbon fibers, poly-parapheneylene tetraphthalamide, para-aramid nylon, aramid fiber, aromatic polyamide, and combinations thereof. In some embodiments, transverse fibers can be in bundles or individual fibers. Other examples of longitudinal threads 28 can include nylon, polyester, polypropylene, nomex, cotton, carbon fibers, poly-parapheneylene tetraphthalamide, para-aramid nylon, aramid fiber, aromatic polyamide, and combinations thereof.

In some embodiments as shown in FIG. 9, the adhesive material 26 (discussed above) is applied to the first surface 36 of the rigidified fiber mesh tape 20 and a thin layer or at least some of the adhesive material 26 remains on the surface 36 of the rigidified fiber mesh tape 20. It should be noted that the openings between the transverse fibers 32 and longitudinal threads 28 remain unobstructed.

As discussed herein, to provide a strong bond between the rigidified fiber mesh tape 20, it is important to have the surface of the rigidified fiber mesh tape 20 clean and roughed. In order to keep the surface clean and provide a roughened surface, over the layer of adhesive material 26, on the surface 36 (and optionally on the surface 38), is applied a flexible cover sheet 30 of impermeable sheet or film comprising textile, nylon, a polymeric or plastic material. The side of the cover sheet 30 in contact with the adhesive material 26 preferably exhibits a texture, such as a woven texture surface 39. The carbon fiber 13 or rigidified fiber mesh tape 20, with the adhesive material 26 and the cover sheet 30 applied, are subject to high temperature and pressure, via known techniques, allowing the adhesive material 26 to cure. Once the adhesive material 26 has cured, the result is a rigid carbon fiber sheet or rigidified fiber mesh tape 20 having a removable cover sheet 30 covering one or both surfaces thereof. This rigid carbon fiber sheet or rigidified fiber mesh tape 20 may then be cut or sawn into the desired sizes. In this form, the rigidified fiber mesh tape 20 can be stored and/or shipped to a job site for use. With the rigidified fiber mesh tape 20, the resin applied during the manufacture of the open fabric tends to fill the window between the mesh. When the textured cover sheet is removed, these windows remain adhered to the cover sheet and leave the openings clear. Thus, the cover sheet provides both a roughened surface, but also open windows.

At the job site, the cover sheet 30 prevents dirt, grease and other debris from coming into contact with the rigidified fiber mesh tape 20. Immediately prior to use, the cover sheet 30 is removed, or more accurately peeled away, from the surface 36 of the carbon fiber strip or rigidified fiber mesh tape 20 leaving exposed a clean roughened surface 38. This roughened surface 38 is a result of at least two factors, individually or in combination. First, the textured surface 39 of the cover sheet 30 causes an impression to be formed in the adhesive material 26 on the surface 36 as it cures. Second, as the cover sheet 30 is removed from the mesh tape 20, some of the adhesive material 26 remains adhered to the plastic sheet 30 and breaks away from the rigidified fiber mesh tape 20.

With the method of the present disclosure, a cost effective and improved method of sealing the seams between bridge segments is provided. It is noted that the sealing method of the present disclosure may also be utilized on road or other bridge surfaces in which grooves or seams are often cut between large concrete or asphalt sections or when road sections are being patched. The use of an adhesive/fibrous seal along the seams between non-movable road or bridge surface sections can prevent the intrusion of water that can cause further cracking along the seams especially in colder climates.

As illustrated in the drawings, the rigidified fiber mesh tape 20 can be pre-cut and can be provided in suitable lengths for their intended use. As will be appreciated by those skilled in the art, a large sheet may be cut to the required sizes before adhering it to reinforce a structural element 12. In some embodiments, the fiber mesh tape 20 can be stored and/or shipped in rolls. In some embodiments, a fit can include adhesive material 26, mesh tape 20 and cover sheet 30, as illustrated in FIG. 11. In some embodiments, the fit can include a cutting tool for cutting mesh tape 20 into desired shapes.

Figure 13:
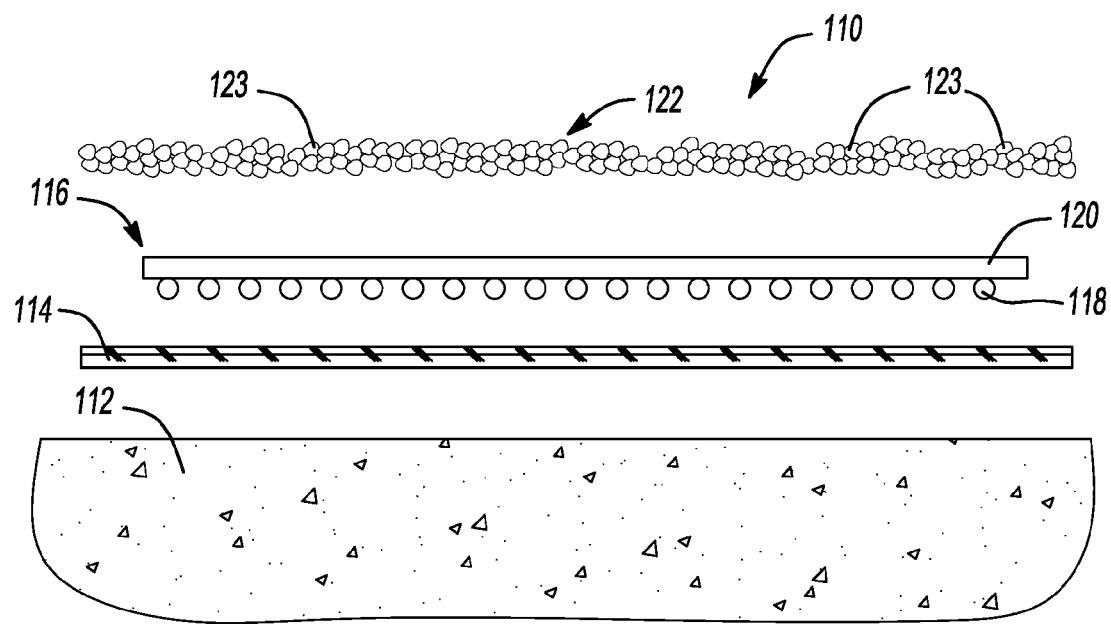
FIG. 13 is a side view of another embodiment of the road surface overlay system.
Figure 14:
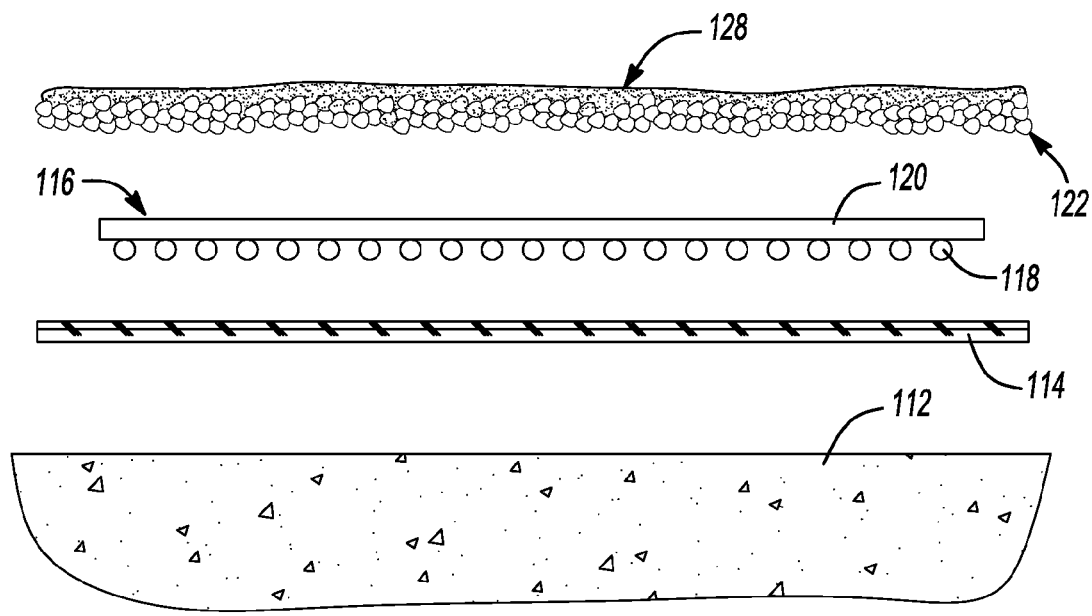
FIG. 14 is a side view of the road surface overlay system in another embodiment according to the principles of the present disclosure.

With reference to FIGS. 12-14 a road surface overlay system 110 is shown including a road surface 112. The road surface 112 may include concrete, asphalt, or any other suitable material. The road surface 112 may include bridge structures, highways, ingress or egress ramps, streets, or any other suitable surface. An epoxy or other suitable adhesive material 114 is applied to a desired area of the road surface 112 after cleaning the road surface 112. The road surface may be cleaned by etching, steam cleaning, acid washing, sand blasting, power washing, for example. While the adhesive material 114 is uncured, a woven member 116 is then applied to the adhesive material 114. The adhesive material 114 may be an epoxy, urethane sealant, silicone sealant or any adhesive material suitable for applying to a road surface 112. The adhesive material 114 may also waterproof the road surface 112. The woven member 116 may be applied in rolls, sheets, grids or any other suitable means known in the art. The woven member 116 may be applied using automated equipment, manual equipment or by hand.

The woven member 116 may include a single transverse fiber bundle 118 and a single longitudinal fiber bundle 120 attached in any manner known to one skilled in the art, for example, in an over-lay, interwoven, stitched, or bonded. Alternatively, the woven member 116 may include a series of transverse fiber bundles 118 and a series of longitudinal fiber bundles 120. It is understood that securing the transverse fiber bundles 118 to the longitudinal fiber bundles 120 using thread, adhesive or any other means suitable in the art is comprehended by the term woven member 116. The woven member 116 may be immersed into the adhesive material 114 to improve the adhesive bond of the woven member 116 and the adhesive material 114. The longitudinal fiber bundles 120 are generally at 90 degree angles (transverse) to the transverse fiber bundles 118. In some embodiments, the longitudinal fiber bundles 120 may be at 45-degree angles to the transverse fiber bundles 118, or some angle between 45-degrees and 90-degrees. In a 45-degree fiber orientation, the longitudinal fiber bundles 120 tend to be loaded in tension along with the transverse fiber bundles 118.

The transverse and longitudinal fiber bundles 118, 120 may include carbon fibers, Kevlar fibers, fiberglass, carbon fibers, poly-parapheneylene tetraphthalamide, para-aramid nylon, aramid fiber, aromatic polyamide, and combinations thereof or other suitable man made and naturally occurring fibers that exhibit satisfactory strength and flexibility characteristics. It is appreciated that the transverse and longitudinal fiber bundles 118, 120 may be bundles or individual fibers.

A layer of aggregate 122 can be applied over the woven member 116 so as to be embedded in the adhesive material 114. The layer of aggregate 122 can be applied using a spreading device 124 or any other suitable means known in the art. The layer of aggregate 122 provides a covering over the woven member 116. The layer of aggregate 122 may protect the woven member 116 from deterioration caused by traffic and severe weather. The aggregate material may be a stone, a mineral, a compound or any other suitable material known in the art. The thickness of the layer of aggregate 122 may vary by application and may be adjusted to any suitable thickness desired by one skilled in the art. The woven member 116 only requires minimal coverage because of its non-corrosive properties. When the layer of aggregate 122 is applied over the woven member 116 and the adhesive material 114, a series of valleys and voids 123 are formed within the layer of aggregate 122. After the adhesive material 114 has cured, a deicing chemical (not shown) may be applied to the layer of aggregate 122. The deicing chemical may lower the freezing point on the road surface 112, and thus prevent ice from forming. The de-icing chemical will go into the series of valleys and voids 123 and remain there. The de-icing chemical may be selected from liquid calcium chloride, liquid magnesium chloride, and liquid sodium chloride, for example. The de-icing chemical can be applied in a liquid form using a sprayer or in a powder form using a spreader, or any other form suitable in the art.

A second layer of adhesive material 128 may also be applied to the layer of aggregate 122 as shown in FIG. 14. The second layer of adhesive material 128 may prevent water from intruding below the road surface overlay system 110. The second layer of adhesive material 128 may be an epoxy, urethane sealant, silicone sealant or any adhesive material suitable for applying to a road surface 112. The second layer of adhesive 128 may provide a water proofing means. Alternatively, the second layer of adhesive 128 may be substituted for a waterproofing material such as a PVC or bitumen with elastomers, for example. In some embodiments, a road surface overlay kit may be provided that includes an adhesive material 114, woven member 116, and a layer of aggregate 122. In some embodiments, the kit can include a cutting tool (not shown) for cutting the woven member 116 into desired shapes and lengths.

Figure 15:
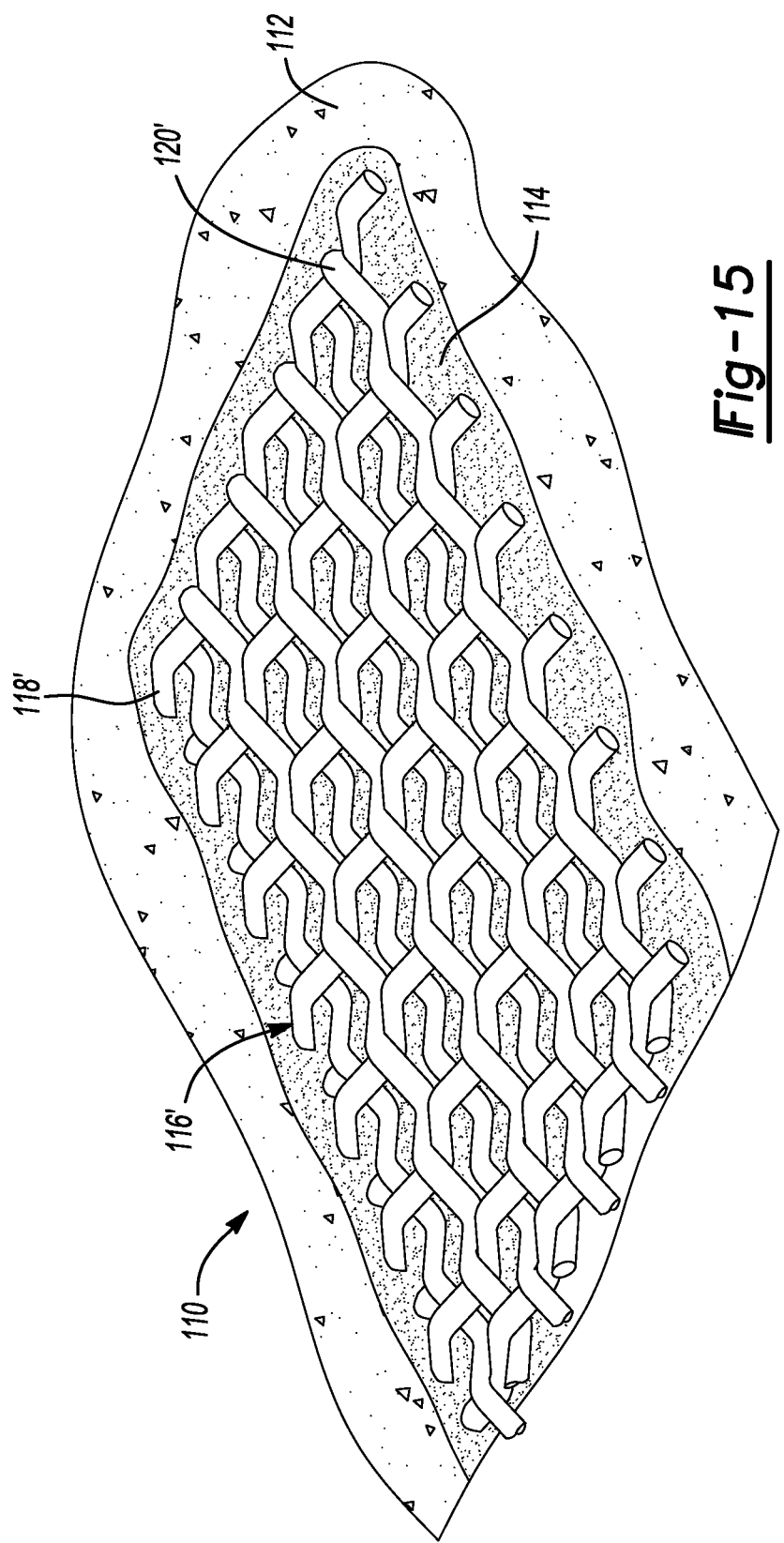
FIG. 15 is a perspective view of a woven material in another embodiment according to the principles of the present disclosure.

With reference to FIG. 15 the woven member 116' is shown in contact with the adhesive material 114 in another embodiment. The woven member 116' includes transverse fiber bundles 118' and longitudinal fiber bundles 120'. The woven member 116' may include transverse fiber bundles 118' and longitudinal fiber bundles 120' attached in any manner known to one skilled in the art, for example, in an over-lay, interwoven, stitched, or bonded. If interwoven, the transverse fiber bundles 118' alternate from a position above the longitudinal fiber bundles 120' to a position below the longitudinal fiber bundles 120'. The longitudinal fiber bundles 120' are generally at 90-degree angles (transverse) to the transverse fiber bundles 118'.

The longitudinal fiber bundles 120' may be at 45-degree angles to the transverse fiber bundles 118', or some angle between 45-degrees and 90-degrees.

The transverse and longitudinal fiber bundles 118', 120' may include carbon fibers, Kevlar fibers, fiberglass, carbon fibers, poly-parapheneylene tetraphthalamide, para-aramid nylon, aramid fiber, aromatic polyamide, and combinations thereof or other suitable man made and naturally occurring fibers that exhibit satisfactory strength and flexibility characteristics. The transverse fibers 118' can be in bundles or individual fibers. The transverse fiber bundles 118' and the longitudinal fiber bundles 120' may be woven to desired densities to allow proper adhesive wetting of the woven member 116' during application with the adhesive material 114.

The woven member 116' can also be pre-coated with the adhesive material 114 and thermally cured to provide a flexible, yet relatively rigid material that aids in application of the woven member 116' when applied in sheets. It is desirable that the adhesive material 114 wets into the woven member 116' and/or the spaces between the transverse fiber bundles 118' and the longitudinal fiber bundles 120' in order to provide a fiber reinforced water resistant cover to the road surface 112. If weaving transverse fiber bundles 118' and the longitudinal fiber bundles 120' is undesirable, the transverse fiber bundles 118' may be placed in contact with the longitudinal fiber bundles 120' and secured to each other using thread 126. The transverse fiber bundles 118' and the longitudinal fiber bundles 120' may also be secured to each other by an adhesive material 114. It is understood that securing the transverse fiber bundles 118' to the longitudinal fiber bundles 120' using thread, adhesive or any other means suitable in the art is comprehended by the term woven member 116'.

In some embodiments, the transverse fiber bundles 118' and longitudinal fiber bundles 120' may be spaced anywhere from over 1 inch apart to less than ⅟₃₂ inches apart so long as the spacing is sufficient to allow an adhesive material 14 to flow therebetween. The transverse fiber bundles 118' and/or the longitudinal fiber bundles 120' are made of pre-cured carbon, although any material providing flexibility and tensional strength may be used. Moreover, transverse fiber bundles 118' and longitudinal fiber bundles 120' may be of the same or different materials. For example, transverse fiber bundles 118' may be Kevlar or bundles of Kevlar and longitudinal fiber bundles 120' may be nylon or a nylon blend. Other examples of longitudinal fiber bundles 120' include carbon fibers, poly-parapheneylene tetraphthalamide, para-aramid nylon, aramid fiber, aromatic polyamide, and combinations thereof. Other examples of transverse and longitudinal fiber bundles 118', 120' can include nylon, polyester, polypropylene, nomex, cotton, carbon fibers, poly-parapheneylene tetraphthalamide, para-aramid nylon, aramid fiber, aromatic polyamide, and combinations thereof.

Figure 16:
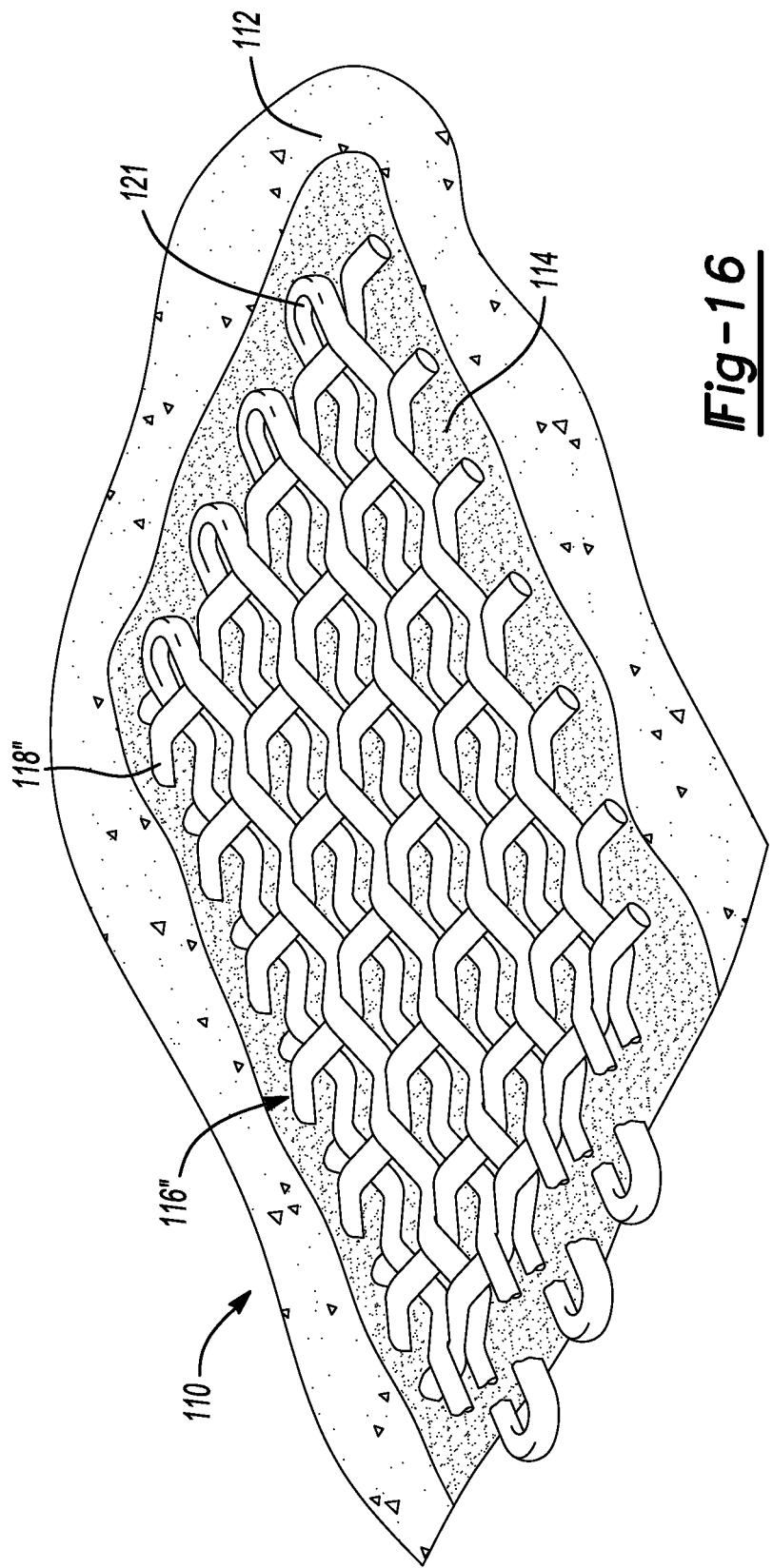
FIG. 16 is a perspective view of a woven member in another embodiment according to the principles of the present disclosure.

With reference to FIG. 16, another embodiment of the woven member 116" is shown in contact with the adhesive material 114. A first longitudinal fiber bundle 121 may be aligned and woven in alternating longitudinal directions in a serpentine fashion. The length of the first longitudinal fiber bundle 121 may be modified to provide desired coverage of any road surface 112. The transverse fiber bundles 118" may be aligned in a transverse direction and woven into each of the rows of the first longitudinal fiber bundle 121 where the transverse fiber bundles 118" may alternate from a position above the first longitudinal fiber bundle 121 to a position below the first longitudinal fiber bundle 121. Alternatively, the transverse fiber bundles 118" may be in contact with the first longitudinal fiber bundle 121 and secured to each other using thread 126 as shown in FIG. 12. The transverse fiber bundles 118" may be in contact with the first longitudinal fiber bundle 121 and secured by an adhesive material 114.

Alternatively, a first transverse fiber bundle (not shown) may be used rather than a plurality of transverse fiber bundles 118". The first transverse fiber bundle may be aligned and woven in alternating transverse directions in a serpentine fashion. The length of the first transverse fiber bundle may be modified to provide desired coverage of any road surface 112. The first transverse fiber bundle may be aligned in a transverse direction and woven into the first longitudinal fiber bundle 121. The first transverse fiber bundle may be in contact with the first longitudinal fiber bundle 121 and secured to each other using thread 126 as shown in FIG. 12. Alternatively, the first transverse fiber bundle may be in contact with the first longitudinal fiber bundle 121 and secured to the first longitudinal fiber bundle 121 using an adhesive material 114. It is understood that securing the transverse fiber bundles 118' to the longitudinal fiber bundles 120' using thread, adhesive or any other means suitable in the art is comprehended by the term woven member 116".

Figure 17:
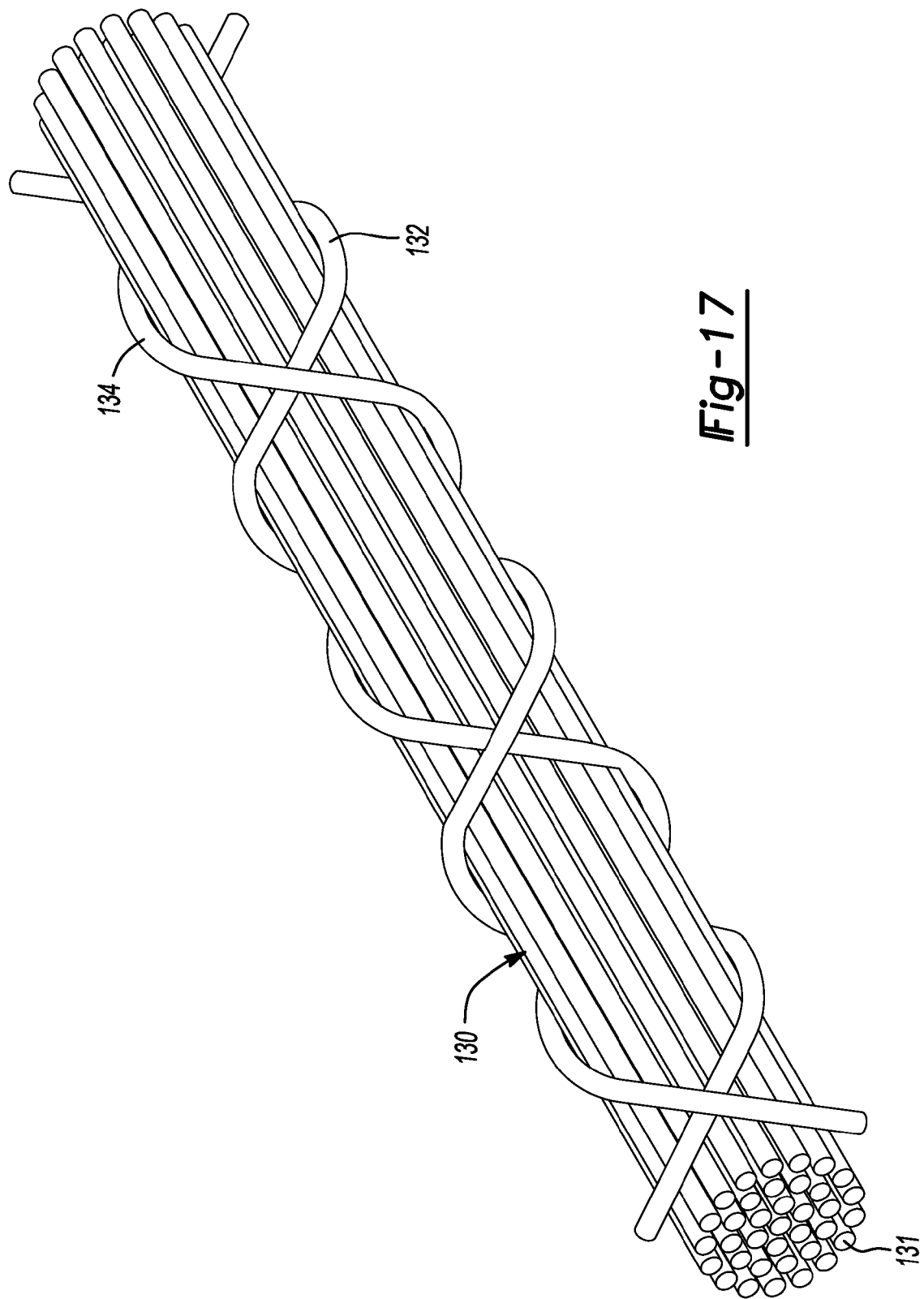
FIG. 17 is a perspective view of a woven member including a plurality of threads.

With reference to FIG. 17, a first fiber bundle 130 is shown including a first thread 132 and a second thread 134. The first fiber bundle 130 is shown in a round cross-sectional shape but the first fiber bundle 130 may be any cross-sectional shape, such as flat (ribbon like), rectangular, oval, or any suitable shape known in the art. The first fiber bundle 130 contains a plurality of fiber strands 131. The plurality of fiber strands 131 may be aligned adjacently and held together by at least one of a first thread 132 and a second thread 134. The plurality of fiber strands 131 may be held together using an adhesive material. Alternatively, the plurality of fiber strands 131 may be woven together. Weaving the plurality of fiber strands 131 may eliminate the need for an adhesive or thread. The plurality of fiber strands 131 may be held together in any suitable manner known in the art.

The first thread 132 and the second thread 134 may include carbon fibers, Kevlar fibers, fiberglass, carbon fibers, poly-parapheneylene tetraphthalamide, para-aramid nylon, aramid fiber, aromatic polyamide, and combinations thereof or other suitable man made and naturally occurring threads that exhibit satisfactory strength and flexibility characteristics.

The first thread 132 may be wrapped around the first fiber bundle 130 in a first direction and the second thread 134 may be wrapped around the first fiber bundle 130 in a second direction that is different than the first direction.

The first thread 132 and the second thread 134 may include carbon fibers, Kevlar fibers, fiberglass, carbon fibers, poly-parapheneylene tetraphthalamide, para-aramid nylon, aramid fiber, aromatic polyamide, and combinations thereof or other suitable man made and naturally occurring threads that exhibit satisfactory strength and flexibility characteristics. The first thread 132 may be wrapped around the first fiber bundle 130 in a first direction and the second thread 134 may be wrapped around the first fiber bundle 130 in a second direction that is different than the first direction. Alternatively, a first thread 132 may be wrapped around the first fiber bundle 130.

Figure 18:
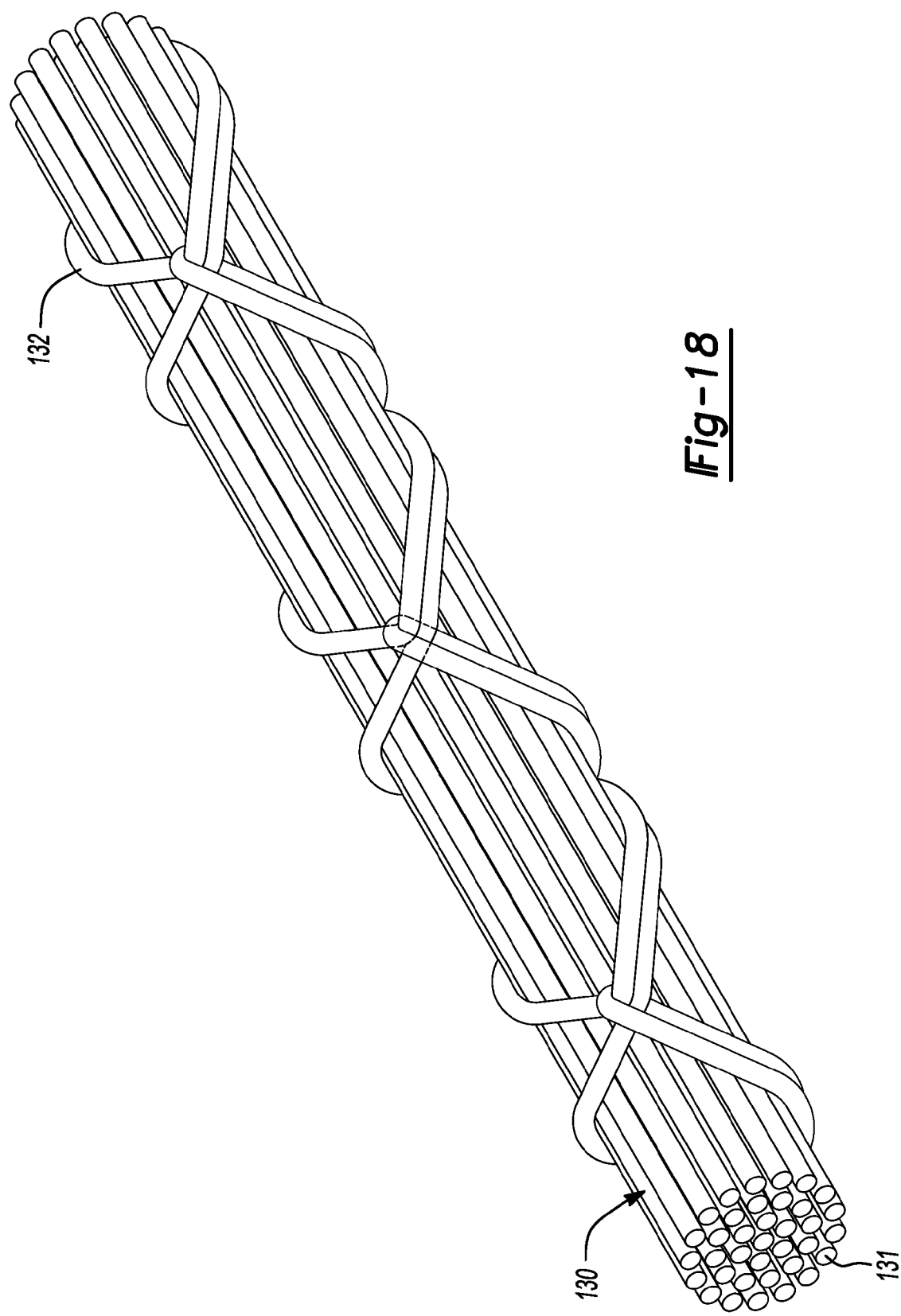
FIG. 18 is a perspective view of a woven member including a single thread in another embodiment according to the principles of the present disclosure.

With reference to FIG. 18, a first fiber bundle 130 is shown including a first thread 132 that may be wrapped around the first fiber bundle 130 in an orientation that does not require the use of a second thread. The first fiber bundle 130 is shown in a round cross-sectional shape but the first fiber bundle 130 may be any cross-sectional shape, such as flat (ribbon like), rectangular, oval, or any suitable shape known in the art. The first fiber bundle 130 contains a plurality of fiber strands 131. The plurality of fiber strands 131 may be aligned adjacently and held together by a first thread 132. The plurality of fiber strands 131 may be held together using an adhesive material. Alternatively, the plurality of fiber strands 131 may be woven together. Weaving the plurality of fiber strands 131 may eliminate the need for an adhesive or a first thread 132. The plurality of fiber strands 131 may be held together in any suitable manner known in the art.

The first thread 132 may include carbon fibers, Kevlar fibers, fiberglass, carbon fibers, poly-parapheneylene tetraphthalamide, para-aramid nylon, aramid fiber, aromatic polyamide, and combinations thereof or other suitable man made and naturally occurring threads that exhibit satisfactory strength and flexibility characteristics.

Figure 19:
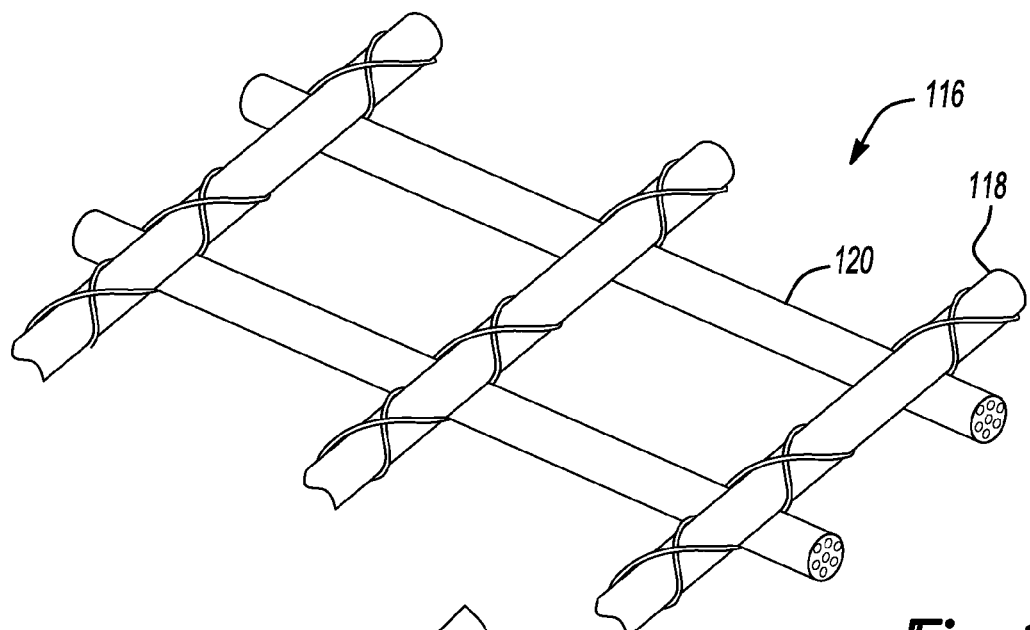
FIG. 19 is a partial perspective view of an embodiment of the woven member according to the principles of the present disclosure.
Figure 20:
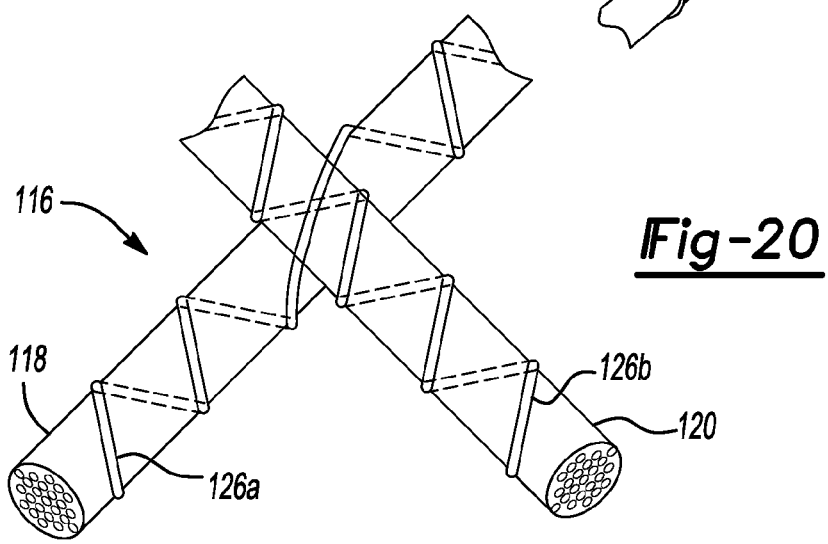
FIG. 20 is a partial perspective view of a transverse fiber bundle and a longitudinal fiber bundle according to an embodiment of the woven member.
Figure 21:
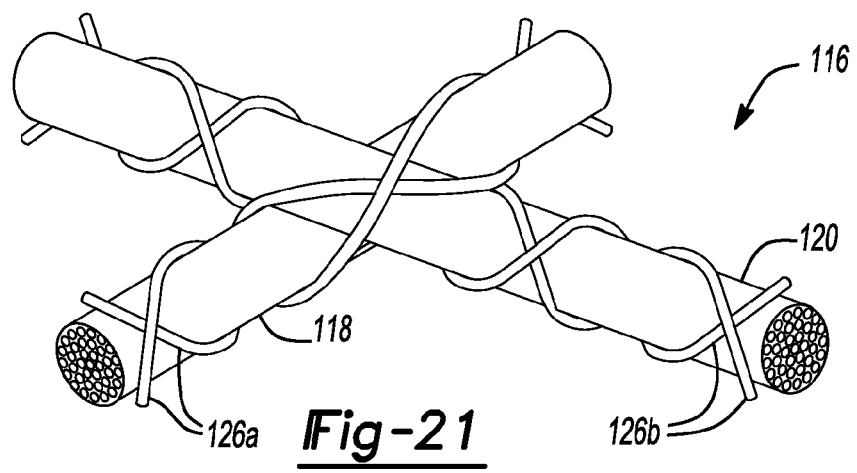
FIG. 21 is a partial perspective view of a transverse fiber bundle and a longitudinal fiber bundle according to another embodiment of the woven member.

With reference to FIGS. 19-21, additional embodiments of the woven member 116 will be described. In some embodiments, each of the transverse fiber bundles 118 may be spaced about 1 to 4 inches apart from each other, and the longitudinal fiber bundles 120 may be spaced about 1 to 4 inches apart from each other. The spacing between fiber bundles 118, 120 can be selected to suit a particular application and can also be more than 4 inches and less than 1 inch depending on the application. Threads 126a, 126b may secure the transverse fiber bundles 118 and the longitudinal fiber bundles 120 to each other to form a grid. The woven member 116 may be woven, stitched or knitted by a single or double needle bed warp knitting machine manufactured by Jakob Müller AG (sold by Jakob Mueller of America, Inc.), for example, or any other suitable knitting or weaving machine.

An adhesive material, such as an epoxy, may be applied to the fiber bundles 118, 120 and threads 126a, 126b to increase the rigidity of the woven member 116. The epoxy may be PRO-SET® M10-12, for example, or other high temperature epoxy. Aggregate material 122, such as crushed quartz, for example, may be at least partially embedded in the adhesive material. The aggregate material may be about 0.030-0.050 inches in diameter, for example. The aggregate material increases the roughness of the woven member 116, and may facilitate mechanical engagement or bonding between the woven member 116 and concrete, mortar, asphalt or pavement, for example.

As shown in FIG. 20, at least one thread 126a and at least one thread 126b may be continuously wrapped or wound around each of the transverse and longitudinal fiber bundles 118, 120, respectively, in generally helical patterns. In the particular embodiment illustrated in FIG. 20, the thread 126a wrapped around the transverse fiber bundle 118 extends across the widths of the longitudinal fiber bundles 120 at the intersections of the transverse and longitudinal fiber bundles 118, 120 (i.e., across the top of the longitudinal fiber bundle 120 relative to the view shown in FIG. 20). In this manner, the thread 126a may secure each of the longitudinal fiber bundles 120 to each of the transverse fiber bundles 118.

As shown in FIG. 21, two or more threads 126a and two or more threads 126b may be continuously wrapped around each of the transverse and longitudinal fiber bundles 118, 120, respectively, in generally helical patterns. The two or more threads 126a may be wrapped in helical patterns that are substantially out of phase with each other, such that the two or more threads 126a intersect each other periodically. Likewise, the two or more threads 126b may be wrapped in helical patterns that are substantially out of phase with each other, such that the two or more threads 126b intersect each other periodically. The two or more of the threads 126a wrapped around each of the transverse fiber bundles 118 may extend across the widths of the longitudinal fiber bundles 120 at the intersections of the transverse and longitudinal fiber bundles 118, 120 (i.e., across the top of the longitudinal fiber bundle 120 relative to the view shown in FIG. 21). In this manner, the two or more threads 126a may secure each of the longitudinal fiber bundles 120 to each of the transverse fiber bundles 118. While the fiber bundles 118, 120 are described above as being secured together via the one or more threads 126a it will be appreciated that the one or more threads 126b wrapping around each longitudinal fiber bundle 120 may extend across the widths of each transverse fiber bundle 118 (i.e., below the transverse fiber bundle 118 relative to the views shown in FIGS. 20 and 21).

With reference to FIG. 22, an exemplary method of manufacturing the woven member 116 will be described. The method may include weaving the woven member 116, applying the adhesive material to the woven member 116, applying the aggregate material 122 to the woven member 116, and curing the adhesive material. The method may incorporate a production line 200, which may at least partially automate at least some of these steps. The production line 200 may include a weaving machine 202, an epoxy bath 204, an aggregate application device 206, and a curing device 208. The production line 200 can be a continuous production line such that the woven member 116 is fed from the weaving machine 202, to the epoxy bath 204, to the aggregate application device 206 and to the curing device, as shown in FIG. 22. However, it will be appreciated that one or more steps of the process may be performed individually or in isolation from the remaining steps.

The weaving machine 202 may be the single or double needle bed warp knitting machine or Rashelina RD3 by Jakob Müller AG (or Jakob Mueller of America, Inc.), for example, or any other suitable machine. The weaving machine 202 may be set or programmed to weave the desired threads and fibers in the desired pattern and at the desired spacing to form the woven member 116 having a design suited for a given application.

The woven member 116 may then be fed into the epoxy bath 204 via a plurality of rollers 210. The epoxy bath 204 may include a tank or container 212 with uncured epoxy contained therein. The woven member 116 may be fed into the tank such that the woven member 116 may be submerged in the uncured epoxy to facilitate wetting. Upon exiting the container 212, the woven member 116 may be covered with the epoxy. It will be appreciated that the epoxy could be applied to the woven member 116 in any other suitable manner. For example, the epoxy could be poured from or squeezed out of a container or sprayed onto the woven member 116.

Next, the woven member 116 may be fed over the aggregate application device 206, where the aggregate material 122 may be applied to the uncured epoxy covering the woven member 116. The aggregate application device 206 may include a motor driven vibration plate 214. The aggregate material 122 may be placed on the vibration plate 214 such that operation of the vibration plate 214 causes the aggregate material to bounce up from the vibration plate 214 and become at least partially embedded in the uncured epoxy covering the woven member 116. It will be appreciated that some of the aggregate material 122 may bounce up through the spaces between the fiber bundles 118, 120. Some of this aggregate material 122 may then fall back down and land on the side of the woven member 116 facing away from the vibration plate 214. In this manner, the woven member 116 may become substantially covered with the aggregate material 122. The amount of aggregate material 122 that embeds into the epoxy may depend on the distance between the woven member 116 and the vibration plate 214, the speed at which the woven member 116 is fed over the vibration plate 214, and the frequency and amplitude of the vibratory motion of the vibration plate 214. Accordingly, these factors may be adjusted or customized to achieve a desired amount of aggregate material 122 bonded to the woven member 116.

It will be appreciated that the aggregate material 122 could be applied to the woven member 116 in any other suitable way. For example, the aggregate material 122 could be poured onto the woven member 116, or the woven member 116 could be fed into a container in which the woven member 116 may be submerged in the aggregate material 122.

Upon receiving the aggregate material 122, the epoxy on the woven member 116 may be cured via the curing device 208, thereby bonding the aggregate material 122 to the fiber bundles 118, 120 and rigidifying the woven member 116. The curing device 208 may be an infrared (IR) lamp, an oven or other heat source, for example.

While the method described above is described above as a method for manufacturing the woven member 116, it should be appreciated that the woven member 116', 116" and/or reinforcement material 10 described above, could also be manufactured in the same or a similar manner.

With reference to FIG. 23, a concrete segment 300 is provided and may include the woven member 116 embedded therein to provide reinforcement for the concrete segment 300. The concrete segment 300 may be a segment of a road, a bridge, a wall or foundation of a building or other structure, a concrete façade for a building or other structure, or a concrete countertop, for example.

The woven member 116 may be embedded into the concrete segment 300 via any suitable method. For example, a first layer 302 of the concrete segment may be poured onto a roadway or into a cast. The woven member 116 may be placed on top of the first layer 302 and subsequently covered by a second layer 304.

Alternatively, the concrete segment 300 may be poured as a single layer. While the concrete is still wet (i.e., before the concrete sets), the woven member 116 can be pressed into the wet concrete until the woven member 116 is submerged in the concrete to an appropriate depth. The appropriate depth may be substantially half of the final thickness of the concrete segment 300, for example, as shown in FIG. 23.

While the woven member 116 is described above as being embedded in and/or reinforcing concrete, it will be appreciated that the woven member 116 can be embedded into other construction materials including, for example, cement, asphalt, mortar and other paving or patching materials. It should also be appreciated that the woven member 116', 116" and/or the reinforcement material 10 could be embedded into construction materials as described above.

The woven member 10, 116, 116', 116" may provide an advantageous alternative to rebar. The transverse and longitudinal fiber bundles 118, 120 may provide tensile strength along their respective longitudinal axes, thereby reinforcing the woven member 116. The woven member 116 may be lighter, less expensive to manufacture and easier to transport than steel rebar. Rebar can rust, which can bleed through and stain the concrete. In some applications, such as concrete façades and concrete countertops, for example, the thickness of the concrete can be thinner if reinforced with the woven member 116, which does not rust. The reduced thickness of the concrete further reduces weight and material costs.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A structure comprising:
   a plurality of first fiber bundles extending substantially parallel to each other;
   a plurality of second fiber bundles extending substantially parallel to each other and substantially perpendicular to said plurality of first fiber bundles;
   an adhesive substantially coating said pluralities of first and second fiber bundles; and
   an aggregate material including one or more kinds of mineral rock fragments adhered to said pluralities of first and second fiber bundles by said adhesive,
   wherein said first and second fiber bundles are embedded in a concrete construction material and adapted to reinforce said concrete construction material.

2. The structure of claim 1, wherein at least one of said pluralities of first and second fiber bundles include substantially round cross sections.

3. The structure of claim 1, wherein said aggregate material includes quartz.

4. The structure of claim 1, wherein said plurality of first fiber bundles and said plurality of second fiber bundles cooperate to form a grid, whereby each of said first fiber bundles are spaced apart from each other, and each of said second fiber bundles are spaced apart from each other.

5. The structure of claim 4, wherein said first fiber bundles are spaced between about one and four inches apart from each other.

6. The structure of claim 5, wherein said second fiber bundles are spaced between about one and four inches apart from each other.

7. The structure of claim 1, wherein said pluralities of first and second fiber bundles provide tensile strength along respective perpendicular axes of said construction material.

8. The structure of claim 1, wherein at least one of said pluralities of first and second fiber bundles are formed from a material selected from the group consisting of carbon fiber, KEVLAR fiber, and a combination thereof.

9. The structure of claim 1, further comprising a plurality of connecting threads continuously wrapped around each of said plurality of first fiber bundles in a helical pattern and securing said plurality of second fiber bundles to each of said plurality of first fiber bundles.

* * * * *